United States Patent [19]

Kubota et al.

[11] Patent Number: 5,429,880
[45] Date of Patent: Jul. 4, 1995

[54] ORGANIC COMPOSITE COATED STEEL SHEET AND A PROCESS FOR MANUFACTURING THE SAME

[75] Inventors: Takahiro Kubota; Masaaki Yamashita, both of Tokyo; Toyofumi Watanabe, Tokyo; Yoshio Kikuta; Kimio Kobori, both of Chiba; Hideaki Ogata, Chiba, all of Japan

[73] Assignee: NKK Corporation, Tokyo, Japan

[21] Appl. No.: 988,947

[22] PCT Filed: Jul. 10, 1992

[86] PCT No.: PCT/JP92/00891
§ 371 Date: Mar. 9, 1993
§ 102(e) Date: Mar. 9, 1993

[87] PCT Pub. No.: WO93/01004
PCT Pub. Date: Jan. 21, 1993

[30] Foreign Application Priority Data

Jul. 11, 1991 [JP] Japan .................................. 3-197165
Jul. 19, 1991 [JP] Japan .................................. 3-203547
Jul. 19, 1991 [JP] Japan .................................. 3-203548

[51] Int. Cl.$^6$ .............................................. B32B 15/08
[52] U.S. Cl. ..................................... 428/623; 428/626; 428/632; 428/659; 427/388.2; 427/410
[58] Field of Search ............... 428/626, 623, 659, 632; 427/409, 410, 388.2

[56] References Cited

U.S. PATENT DOCUMENTS

| | | | |
|---|---|---|---|
| 4,285,789 | 8/1981 | Kobayashi et al. | 204/181 |
| 4,880,891 | 11/1989 | Miyabayashi et al. | 427/388.2 |
| 4,889,775 | 12/1989 | Adaniya et al. | 428/626 |
| 4,971,636 | 11/1990 | Watanabe et al. | 148/265 |
| 4,981,759 | 1/1991 | Nakatani et al. | 428/626 |
| 5,110,689 | 5/1992 | Watanabe et al. | 148/265 |
| 5,147,730 | 9/1992 | Ogishi et al. | 428/623 |
| 5,354,441 | 10/1994 | Matsuo et al. | 427/388.2 |

FOREIGN PATENT DOCUMENTS

| | | |
|---|---|---|
| 64-8033 | 1/1989 | Japan . |
| 64-80522 | 3/1989 | Japan . |
| 2-15177 | 1/1990 | Japan . |
| 2-92533 | 4/1990 | Japan . |
| 2-274532 | 11/1990 | Japan . |
| 3-26539 | 2/1991 | Japan . |

*Primary Examiner*—John Zimmerman
*Attorney, Agent, or Firm*—Nields & Lemack

[57] ABSTRACT

An organic composite coated steel sheet having a high cosmetic corrosion resistance and excellent image clarity which is desired on, for example, the outside of an outer plate forming an automobile body. The steel sheet has a chromate layer formed on the surface of a zinc or a zinc alloy plate steel sheet, and containing a specific weight of chromium, and an organic resin film formed on the chromate layer from a mixture in specific proportions of a blocked urethane-modified epoxy resin and a rust-preventing additive, and having a thickness of 0.2 to 2 microns. The resin is a mixture in specific proportions of a modified epoxy resin (A) which consists of an epoxy resin and a polyfunctional amine, and may further contain a monoisocyanate, or phosphoric acid, and a blocked urethane (B) which consists of a high molecular weight polyol having a molecular weight of 400 or more, a polyisocyanate and a blocking agent. A process for manufacturing the strip is also disclosed.

40 Claims, No Drawings

ORGANIC COMPOSITE COATED STEEL SHEET AND A PROCESS FOR MANUFACTURING THE SAME

TECHNICAL FIELD

This invention relates to a coated steel sheet with a composite layer containing an organic substance, and having an excellent cosmetic corrosion resistance and excellent image clarity which is also excellent in anti-powdering property, weldability and paint adhesion, and which is beneficial for use in making automobile bodies, electric appliances, etc., and also to a process for manufacturing the same.

BACKGROUND ART

The corrosion of automobile bodies by the salts which are sprinkled on road surfaces to prevent their freezing during the wintertime has become a big social problem recently in North America, northern Europe, and other countries or regions having a cold winter. The use of a coated steel sheet having an improved corrosion resistance instead of a conventional cold rolled steel strip has, therefore, been increasing as one of the measures for improving the corrosion resistance of automobile bodies.

Examples of the coated steel sheets are organic composite coated steel sheet, as disclosed in Japanese Patent Applications laid open under Nos. Sho 64-8033 and Hei 2-15177. These steel sheets comprise a steel sheet plated with zinc or a zinc alloy, and coated with a first layer formed by a chromate coating, and a second layer formed thereon by an organic coating composed of an organic resin which comprises a base resin obtained by adding one or more basic nitrogen atoms and two or more primary hydroxyl groups to the ends of molecules or an epoxy resin, a polyisocyanate compound and a blocked isocyanate compound, the organic resin film further containing specific proportions of silica and a sparingly soluble chromate. These strips are excellent in corrosion resistance, weldability, anti-powdering property and paint adhesion.

The recent inclination toward high-class and original automobiles has come to require a greater importance to be placed on the quality of a paint-finished body surface, particularly its image clarity. The organic composite coated steel sheet as hereinabove described has, however, the drawback of being somewhat inferior to the conventional zinc or a zinc alloy plated steel sheet in image clarity as desired of the outer surface of the outer panel of the automobile body, though it may have a good perforation corrosion resistance as required of the inner surfaces of the outer and inner panels of the automobile body. Moreover, the known organic composite coated steel sheet cannot necessarily be said to be capable of forming a satisfactorily cosmetic corrosion resistance outer surface on the outer panel of the automobile body.

Under these circumstances, it is an object of this invention to provide an organic composite coated steel sheet which can form an excellent cosmetic corrosion resistance and image clarity on, for example, the outer surface of the outer panel of an automobile body, and a process for manufacturing the same.

DISCLOSURE OF THE INVENTION

The steel sheet of this invention having a composite coating containing an organic resin has a first layer a chromate layer formed on the surface of a zinc or a zinc alloy plate steel sheet, and having a coating weight of 10 to 200 mg/m$^2$ in terms of metallic chromium, and as a second layer formed on the first layer an organic resin film containing a blocked urethane-modified epoxy resin and a rust-preventing additive in a ratio of 90/10 to 40/60 (by weight), and having a thickness of 0.2 to 2 microns. The basic composition of the blocked urethane-modified epoxy resin is as shown at i) below:

i) A blocked urethane-modified epoxy resin obtained by mixing a modified epoxy resin (A) which comprises an epoxy resin and a polyfunctional amine, and a blocked urethane (B) which comprises a polyol, a polyisocyanate and a blocked agent, in an A/B ratio of 95/5 to 50/50 (by weight).

The use of a modified epoxy resin obtained by adding a monoisocyanate, as well as a polyfunctional amine, to an epoxy resin enables the formation of a film having a still higher level of corrosion resistance. In this case, the composition of the blocked urethane-modified epoxy resin is as shown at ii) below:

(ii) A blocked urethane-modified epoxy resin obtained by mixing a modified epoxy resin (A) which comprises an epoxy resin, a polyfunctional amine and a monoisocyanate, and a blocked urethane (B) which comprises a polyol, a polyisocyanate and a blocking agent, in an A/B ratio of 95/5 to 50/50 (by weight).

The use of a modified epoxy resin obtained by adding phosphoric acid, as well as a polyfunctional amine, to an epoxy resin enables the formation of a film having a higher degree of adhesion to a steel strip, and an improved corrosion resistance. In this case, the composition of the blocked urethane-modified epoxy resin is as shown at iii) below:

iii) A blocked urethane-modified epoxy resin obtained by mixing a modified epoxy resin (A) which comprises an epoxy resin, a polyfunctional amine and phosphoric acid, and a blocked urethane (B) which comprises a polyol, a polyisocyanate and a blocking agent, in an A/B ratio of 95/5 to 50/50 (by weight).

Silica or a sparingly soluble chromate is preferred as the rust-preventing additive in the film forming the second layer. A particularly high level of corrosion resistance can be obtained by adding both of silica and a sparingly soluble chromate in ratios (by weight) as shown below:

Blocked urethane-modified epoxy resin/(silica+a sparingly soluble chromate)=90/10 to 40/60, and silica/a sparingly soluble chromate)=90/10 to 10/90.

The process of this invention for manufacturing a steel sheet having a composite coating as hereinabove described comprises chromating the surface of a zinc or a zinc alloy plated steel sheet by coating it with a chromate solution and drying it without rinsing it with water to form a chromate layer having a coating weight of 10 to 200 mg/m$^2$ in terms of metallic chromium on the strip surface, coating the chromate layer with a paint composition containing a blocked urethane-modified epoxy resin selected from among i) to iii) above and a rust-preventing additive in a ratio of 90/10 to 40/60 (by weight of non-volatile matter), and baking it to form an organic resin film having a thickness of 0.2 to 2 microns on the chromate layer.

Silica or a sparingly soluble chromate is preferably used as the rust-preventing additive to the paint composition. A particularly high level of corrosion resistance can be obtained by adding both of silica and a sparingly soluble chromate in ratios (by weight) as shown below:

Blocked urethane-modified epoxy resin/(silica+a sparingly soluble chromate)=90/10 to 40/60, and silica/a sparingly soluble chromate)=90/10 to 10/90.

DETAILED DESCRIPTION OF THE INVENTION

Description will now be made of the details of this invention and the reasons for the limitations made for defining it.

A zinc or a zinc alloy plated steel sheet is used as a base material. It may, for example, be a steel sheet plated with zinc, a Zn-Ni alloy, a Zn-Fe alloy, a Zn-Mn alloy, a Zn-Al alloy, a Zn-Cr alloy or a Zn-Co-Cr alloy, or a steel sheet plated with a composite layer which contains one or more additives selected from among metal oxides, sparingly soluble chromate, polymers, etc. in a layer of zinc or a zinc alloy. It may also be a steel sheet coated with two or more plating layers of the same or different materials. The plating of the strip can be effected by any method selected from among electrodeposition, hot dipping and vapor-phase deposition on a case to case basis, though electrodeposition has an advantage over the other methods for plating a cold rolled steel strip.

The chromate layer formed on the surface of the steel sheet plated with zinc or a zinc alloy inhibits the corrosion of the steel sheet by its self-healing effect owing to hexavalent chromic acid ions. If the chromate layer has a coating weight of less than 10 mg/m$^2$ in terms of metallic chromium, it cannot be expected to impart any satisfactory corrosion resistance to the steel sheet, and if its coating weight exceeds 200 mg/m$^2$, it lowers the weldability of the steel sheet. Therefore, the chromate layer is so formed as to have a coating weight of 10 to 200 mg/m$^2$ in terms of metallic chromium. Its coating weight is preferably from 20 to 100 mg/m$^2$ in terms of metallic chromium to realized still higher levels of corrosion resistance and weldability.

Any of the reacted-in-place, electrolytic and dried-in-place type of chromate coating can be employed for forming the chromate layer. The dried-in-place type chromate is, however, preferred from the standpoint of corrosion resistance, since it can form a chromate layer containing a large amount of hexavalent chromic acid ions.

The dried-in-place type chromate is carried out by coating the steel sheet plated with zinc or a zinc alloy with a solution consisting mainly of a partially reduced aqueous solution of chromic acid, and further containing one or more additives selected from among (1) to (7) below, if required, and drying it without rinsing it with water:

(1) An organic resin such as a water-soluble or -dispersible acrylic or polyester resin:
(2) a colloid and/or powder of oxide such as silica, alumina, titania or zirconia;
(3) an acid and/or a salt thereof, such as molybdic, tungstic or vanadic acid, or a salt thereof;
(4) a phosphoric acid such as phosphoric or polyphosphoric acid;
(5) a fluoride such as zirconium fluoride, silico-fluoride or titanium fluoride;
(6) a metal ion such as zinc ion; and
(7) an electrically conductive fine powder such as iron phosphide or antimony-doped tin oxide.

A roll coater is usually employed for coating the strip with the solution for its chromate coating, though it is also possible to apply the solution to the strip by dipping or spraying and regulate its coating weight with an air knife, or by roll squeezing.

The organic resin film formed as the second layer on the chromate layer inhibits the excessive dissolution of hexavalent chromic acid ions from the chromate layer into a corrosive environment and thereby allows the chromate layer to produce a sustained effect of preventing corrosion, and the silica or chromate added to the organic resin film further improves the corrosion resistance of the steel sheet. If the organic resin film has a thickness which is smaller than 0.2 micron, so satisfactory corrosion resistance can be expected from the steel sheet, but if its thickness exceeds two microns, it lowers the weldability and image clarity of the steel sheet. Therefore, the organic resin film is formed with a thickness of 0.2 to 2 microns. Its thickness is preferably in the range of 0.3 to 1.5 microns to ensure that the strip have still higher levels of corrosion resistance, weldability and image clarity.

The organic resin film comprises a blocked urethane-modified epoxy resin and a rust-preventing additive.

The basic composition of the blocked urethane-modified epoxy resin is as shown at i) below:

i) A blocked urethane-modified epoxy resin obtained by mixing a modified epoxy resin (A) which comprises an epoxy resin and a polyfunction amine, and a blocked urethane (B) which comprises a polyol, a polyisocyanate and a blocking agent, in an A/B ratio of 95/5 to 50/50 (by weight).

The use of a modified epoxy resin obtained by adding a monoisocyanate, as well as a polyfunctional amine, to an epoxy resin enables the formation of a film having a still higher level of corrosion resistance. In this case, the composition of the blocked urethane-modified epoxy resin is as shown at ii) below:

ii) A blocked urethane-modified epoxy resin obtained by mixing a modified epoxy resin (A) which comprises an epoxy resin, a polyfunctional amine and a monoisocyanate, and a blocked urethane (B) which comprises a polyol, a polyisocyanate and a blocking agent, in an A/B ratio of 95/5 to 50/50 (by weight).

The use of a modified epoxy resin obtained by adding phosphoric acid, as well as a polyfunctional amine, to an epoxy resin enables the formation of a film having a higher level of adhesion to a steel sheet, and an improved corrosion resistance. In this case, the composition of the blocked urethane-modified epoxy resin is as shown at iii) below:

iii) A blocked urethane-modified epoxy resin obtained by mixing a modified epoxy resin (A) which comprises an epoxy resin, a polyfunctional amine and phosphoric acid, and a blocked urethane (B) which comprises a polyol, a polyisocyanate and a blocking agent, in an A/B ratio of 95/5 to 50/50 (by weight).

The epoxy resin which can be employed for the purpose of this invention is, for example,
an epoxy resin obtained as a glycidyl ether of bisphenol A or F, or a novolak; or an epoxy resin obtained as a glycidyl ether by adding propylene or ethylene oxide to bisphenol A.

It is also possible to use an aliphatic, alicyclic, or polyether-based epoxy resin. It is possible to use two or more epoxy resin together. It is preferable from the standpoint of corrosion resistance to use an epoxy resin having an epoxy equivalent of 400 or above.

The modified epoxy resin (A) can be obtained if the glycidyl group in the epoxy resin is reacted with a polyfunctional amine. Examples of the polyfunctional amine include:
- a primary alkanolamine such as ethanolamine, propanolamine, isopropanolamine or butanolamine;
- a primary alkylamine such as propylamine, butylamine, octylamine or decylamine; and
- a polyfunctional amine having two or more active hydrogen atoms in one molecule, such as ethylenediamine, diethylenetriamine, tetraethylenepentamine, xylenediamine, aminoethylpiperazine or norbornanediaminomethyl, It is possible to use two or more amines together. The use of an alkanolamine is preferred from the standpoints of corrosion resistance and paint adhesion.

The modified epoxy resin (A) can, for example, be produced by reacting at a temperature of 70° C. to 150° C. for 4 to 10 hours the epoxy resin and the polyfunctional amine which have been so mixed that the active hydrogen in the polyfunctional amine may have an equivalent which is from 1.1 to 1.8 times greater than that of the glycidyl group in the epoxy resin.

The modified epoxy resin (A) can also be prepared by reacting the glycidyl group in the epoxy resin with the polyfunctional amine, and reacting the reaction product thereof with a monoisocyanate compound.

The monoisocyanate compound can be obtained by reacting an aliphatic or aromatic monoamine with phosgene. It is also possible to use a product obtained by reacting one of the isocyanate groups in a diisocyanate compound with an aliphatic, aromatic or alicyclic alcohol. In this case, the use of an alcohol having four or more carbon atoms is preferred from the standpoint of its compatibility with the epoxy resin. Examples of the diisocyanate compound include:
- an aliphatic isocyanate compound such as hexamethylene diisocyanate or trimethylhexamethylene diisocyanate;
- an aromatic isocyanate compound such as xylylene diisocyanate, 2,4-tolylene diisocyanate or 2,6-tolylene diisocyanate; and
- an alicyclic isocyanate compound such as isophorone diisocyanate or norbornane diisocyanate methyl.

It is possible to use two or more diisocyanates compound together. The modification of the epoxy resin with the monoisocyanate compound gives an improved corrosion resistance.

The modified epoxy resin (A) which comprises an epoxy resin, a polyfunctional amine and a monoisocyanate compound can, for example, by synthesized by reacting at a temperature of 70° C. to 150° C. for 4 to 10 hours the epoxy resin and polyfunctional amine which have been so mixed that the active hydrogen in the polyfunctional amine may have an equivalent which is from 1.1 to 1.8 times greater than that of the glycidyl group in the epoxy resin, adding the monoisocyanate so that it may have an equivalent which is from 0.7 to 2.0 times greater than that of the active hydrogen in the remaining amine, and continuing the reaction at a temperature of 30° C. to 100° C.

The modified epoxy resin (A) can also be prepared by reacting the glycidyl group in an epoxy resin with a polyfunctional amine and a phosphoric acid.

The phosphoric acid which can be employed contains at least one P-OH group in a molecule, and may, for example, be orthophosphoric or pyrophorphoric acid, phosphorous acid, or polyphosphoric acid. It is also possible to use an ester of any such phosphoric acid, such as an alkyl or hydroxyalkyl ester thereof. The modification of the epoxy resin with phosphoric acid enables an improved adhesion to a steel strip.

The modified epoxy resin (A) which comprises an epoxy resin, a polyfunctional amine and a phosphoric acid can, for example, by synthesized by reacting at a temperature of 70° C. to 150° C. for 4 to 10 hours the epoxy resin, polyfunctional amine and phosphoric acid which have been so mixed that the active hydrogen in the polyfunctional amine may have an equivalent which is 0.5 to 0.9 time greater than that of the glycidyl group in the epoxy resin, while the P-OH group in the phosphoric acid has an equivalent which is 0.1 to 0.5 time greater than that of the glycidyl group, or by reacting them stepwise.

The blocked urethane which is used for the purpose of this invention contains an appropriate compound which protects and renders inactive the highly active isocyanate group in an isocyanate compound, and the isocyanate group readily recovers its activity upon heating as a result of the dissociation of the blocking agent. It, therefore, serves as a curing agent for the modified epoxy resin.

The polyol which can be employed may, for example, be:
- a divalent alcohol such as ethylene glycol, propylene glycol, 1,6-hexanediol, diethylene glycol or triethylene glycol;
- a trivalent alcohol such as glycerol or trimethylolpropane;
- a low-molecular weight polyol such as pentaerythritol;
- a polyester polyol which is polymerized form caprolactone or a low-molecular weight polyol, and dicarboxylic acid; or
- a high-molecular weight polyol having a molecular weight of 400 or above, such as polyethylene glycol, polypropylene glycol or polytetramethylene glycol.

It is also possible to use two or more polyols together. The use of a high-molecular polyol is preferred, since it enables the formation of an organic resin film having an appropriately hydrophilic property and thereby an improved affinity for a cationic electrodeposition paint which enables the formation of a smooth surface of electrodeposited coatings intermediate- or top-coat surface having an excellent level of clarity.

The polyisocyanate which can be employed may, for example, be:
- an aliphatic isocyanate compound such as hexamethylene diisocyanate or trimethylhexamethylene diisocyanate;
- an aromatic isocyanate compound such as xylylene diisocyanate, 2,4-tolylene diisocyanate or 2,6-tolylene diisocyanate; or
- an alicyclic isocyanate compound such as isophorone diisocyanate or norbornane diisocyanate methyl.

It is also possible to use a mixture, or adduct thereof.

The blocking agent which can be employed may, for example, be:
- a compound of the phenol series, such as phenol;
- a compound of the lactam series, such as ε-caprolactam;
- a compound of the oxime series, such as methyl ethyl ketooxime; or
- a compound of the imine series, such as ethyleneimine.

It is also possible to use a mixture of two or more such compounds.

The blocked isocyanate (B) can be obtained by reacting a mixture of polyisocyanate and polyol in which the polyisocyanate contains an excess of isocyanate group over the hydroxyl group in the polyol, whereby a prepolymer is produced, and protecting the isocyanate group remaining in the prepolymer with the blocking agent. A reaction temperature of 30° C. to 100° C. is employed.

The blocked urethane-modified epoxy resin according to this invention can be obtained by mixing the modified epoxy resin (A) and the blocked urethane (B). They are mixed in an A/B ratio of 95/5 to 50/50 (by weight of nonvolatile matter). No A/B ratio exceeding 95/5 is desirable, as it results in an intermediate- or top-coat surface of lower clarity. No ratio that is smaller than 50/50 is desirable, either, as it results in a lower level of corrosion resistance. The A/B ratio is preferably from 90/10 to 60/40 to achieve still higher levels of surface clarity and corrosion resistance.

An improved corrosion resistance can be achieved by adding silica and/or a sparingly soluble chromate to the blocked urethane-modified epoxy resin.

Silica promotes the formation, among other corrosion products of a zinc or a zinc alloy plated steel sheet, of basic zinc chloride which is an effective corrosion inhibitor. Moreover, silica apparently owes its corrosion-preventing effect to the fact that it is slightly soluble in a corrosive environment and forms a silicic acid ion which serves as a film-forming corrosion inhibitor. If the blocked urethane-modified epoxy resin and silica are employed in a ratio exceeding 90/10 by weight of nonvolatile matter, silica does not exhibit any satisfactory corrosion-preventing effect, but the film has a lower level of corrosion resistance. If their ratio is smaller than 40/60 by weight of nonvolatile matter, the blocked urethane-modified epoxy resin fails to be an effective binder, and the film has a lower level of paint adhesion. Therefore, the blocked urethane-modified epoxy resin and silica are preferably employed in a ratio of 90/10 to 40/60 by weight of nonvolatile matter.

The silica which can be employed for the purpose of this invention may, for example, be:
- silica produced by a dry process (e.g. products of Nippon Aerosil Co., Ltd. known as AEROSIL 130, AEROSIL 200, AEROSIL 300, AEROSIL 380, AEROSIL R972, AEROSIL R811 and AEROSIL R805);
- organosilica sol (e.g. products of Nissan Chemical Industries, Ltd. known as MA-ST, IPA-ST, NBA-ST, IBA-ST, EG-ST, XBA-ST, ETC-ST and DMAC-ST);
- silica produced by a wet process of sedimentation (e.g. products of Tokuyama Soda Co., Ltd. known as T-32(S), K-41 and F-80; or
- silica produced by a wet process of gelling (e.g. products of Fuji-Davison Chemical Ltd. know as SYLOID 244, SYLOID 150, SYLOID 72, SYLOID 65 and SHIELDEX).

It is also possible to use a mixture of two or more types of silica.

The addition to the blocked urethane-modified epoxy resin of hydrophobic silica having a surface rendered hydrophobic by the replacement of its silanol group with a methyl group, etc. results in an organic film which has a poor affinity for a cationic electrodeposition paint. The film disables the formation of a smooth electrodeposited paint, and top-coat surface from having a high level of image clarity. Therefore, the use of silica not having a hydrophobic surface is preferred to achieve a high level of image clarity.

The sparingly soluble chromate which is added to the organic film is considered to inhibit the corrosion of the steel sheet by discharging hexavalent chromic acid ions as a result of its slight dissolution in a corrosive environment, as is the case with the chromate layer. If the blocked urethane-modified epoxy resin and the sparingly soluble chromate are employed in a ratio exceeding 90/10 by weight of nonvolatile matter, however, the sparingly soluble chromate does not exhibit any satisfactory corrosion-preventing effect, but the film has a lower level of corrosion resistance. If their ratio is smaller than 40/60 by weight of nonvolatile matter, the blocked urethane-modified epoxy resin fails to be an effective binder, and the film has a lower level of paint adhesion. Therefore, the blocked urethane-modified epoxy resin and the sparingly soluble chromate are preferably employed in a ratio of 90/10 to 40/60 by weight of nonvolatile matter.

The sparingly soluble chromate which can be employed for the purpose of this invention is, for example, a fine powder of barium chromate ($BaCrO_4$), strontium chromate ($SrCrO_4$), calcium chromate ($CaCrO_4$), zinc chromate ($ZnCrO_4.4Zn(OH)_2$), potassium zinc chromate ($K_2O.4ZnO.4CrO_3.3H_2O$), or lead chromate ($PbCrO_4$). It is also possible to use a mixture of two or more such salts. It is, however, preferable from the standpoint of corrosion resistance to use barium or strontium chromate, or both, since they can be expected to exhibit a self-healing effect by chromic acid ions over a long period of time. The use of barium chromate which is poorly soluble in water is preferred to minimize the dissociation of water-soluble chromium from the organic film during the treatment of automobiles prior to paint application.

The addition of both silica and a sparingly soluble chromate in specific proportions to the blocked urethane-modified epoxy resin enables the best corrosion resistance to be achieved by the combined corrosion-preventing effects thereof. More specifically, the best corrosion resistance can be obtained if silica and sparingly soluble chromate are employed in the following ratios by weight of nonvolatile matter:

(1) Blocked urethane-modified epoxy resin/(silica + sparingly soluble chromate) = 90/10 to 40/60; and silica/a sparingly soluble chromate) = 90/10 to 10/90.

(2) Silica/sparingly soluble chromate acid salt = 90/10 to 10/90.

If the ratio of blocked urethane-modified epoxy resin/(silica + sparingly soluble chromate) exceeds 90/10, the silica and sparingly soluble chromate do not exhibit any satisfactory corrosion-preventing effect, but the film has a lower level of corrosion resistance. If their ratio is smaller than 40/60, the blocked urethane-modified epoxy resin fails to be an effective binder, and the paint applied to the film has a lower level of adhesion to it. If the ratio of silica/sparingly soluble chromic acid salt exceeds 90/10, or is smaller than 10/90, the combined effect thereof is unsatisfactory and the film has a somewhat lower level of corrosion resistance.

Although silica and/or a sparingly soluble chromic acid salt is the principal additive to the blocked urethane-modified epoxy resin, it is also possible to add, for example, at least one of a silane coupling agent, a color pigment (e.g. an organic pigment of the condensed polycyclic type, or of the phthalocyanine series), a color dye (e.g. an azo dye, or a dye composed of a complex salt of an azo dye and a metal), a lubricant (e.g. polyethylene wax, fluororesin, graphite, or molybdenum disulfide), a rust-inhibitive pigment (e.g. aluminum dihydrogen tripolyphosphate, aluminum phosphomolybdate, or zinc phosphate), an electrically conductive pigment (e.g. iron phosphide, or antimony-doped tin oxide), and a surface active agent.

A roll coater is usually employed for coating the strip with the paint composition as hereinabove described, though it is also possible to apply the composition by dipping or spraying and regulate its coating weight with an air knife, or by roll squeezing. A hot-air, high-frequency induction, or infrared heating oven can, for example, be employed for heating the strip coated with the paint composition. It is heated to a temperature of from 50° C. to 300° C., and preferably from 60° C. to 250° C. If this invention is applied to a steel sheet with bake hardenability, it is preferably heated to a temperature not exceeding 150° C.

Although the steel strip of this invention usually has a layer of zinc or a zinc alloy, a chromate layer and an organic resin film on each side thereof, this invention covers also a strip having a layer of zinc or a zinc alloy, a chromate layer and an organic resin film formed only on one side thereof, while the other side thereof consists of a steel surface, a surface plated with zinc or a zinc alloy, or a surface plated with zinc or a zinc alloy and coated with a chromate layer.

EXAMPLES

Steel strips plated with zinc or zinc alloys were degreased with an alkali, rinsed with water, dried, given chromating treatment, and coated with paint compositions by a roll coater, followed by their baking, to prepare coated steel sheet for making automobile bodies.

The resulting steel sheets each coated with an organic composite coating were tested for corrosion resistance, image clarity, paint adhesion and weldability. The conditions employed for their preparation were as follows:

[1] Zinc or a zinc alloy plated steel sheets

Cold rolled steel sheets having a thickness of 0.8 mm and a surface roughness (Ra) of 1.0 micron and plated with zinc or zinc alloys were used as the base materials for the following treatment (see TABLE 1).

[2] Chromating treatment (1) Dried-in-place type chromate coating

A chromating solution having the composition shown below was applied by a roll coater, and dried without rinsing with water. The coating weight of the chromate layer was controlled by varying the ratio in peripheral speed of the pickup and applicator rolls in the roll coater.

Chromic anhydride: 20 g/l.
Phosphoric acid ion: 4 g/l.
Zirconium fluoride ion: 1 g/l.
Zinc ion: 1 g/l.
Hexavalent chromium/trivalent chromium: 3/3 (by weight).
Chromic acid anhydride/zirconium fluoride ion: 20/1 (by weight).

(2) Electrolytic chromate coating

A bath containing 30 g of chromic acid anhydride and 0.2 g of sulfuric acid per liter and having a temperature of 40° C., was used for cathode electrolysis at a current density of 10 A/dm$^2$ to form a chromate layer on the strip, followed by rinsing with water, and drying. The coating weight of the chromate layer was regulated by controlling the amount of the electric current employed for the electrolysis.

(3) Reacted-in-place type chromate coating

A solution containing 30 g of chromic acid anhydride, 10 g of phosphoric acid, 0.5 g of NaF and 4 g of $K_2TiF_6$ per liter and having a temperature of 60° C. was sprayed on the strip, followed by rinsing with water, and drying. The coating weight of the chromate layer was controlled by varying the length of time employed for the treatment.

[3] Organic Resin

The organic resins which were employed are shown in TABLES 2 to 4. The modified epoxy resins ($A_1$) to ($A_3$) and blocked urethanes (B) appearing in the tables were prepared by the processed described below.

(1) Modified epoxy resin ($A_1$)

A reaction vessel equipped with a condenser, a stirrer and a thermometer was charged with 1200 parts of a bisphenol A epoxy resin having an epoxy equivalent of 2000, 800 parts of xylene and 1050 parts of cyclohexanone, and they were heated under stirring to form a solution. 36 parts of isopropanolamine was added, and reacted at 100° C. for five hours to yield a modified epoxy resin $A_1$ having a resin content of 40%.

(2) Modified Epoxy Resin ($A_2$)

A reaction vessel equipped with a condenser, a stirrer and a thermometer was charged with 500 parts of a bisphenol A epoxy resin having an epoxy equivalent of 1500, 385 parts of xylene and 385 parts of cyclohexanone, and they were heated under stirring to form a solution. 20 parts of isopropanolamine was added, and reacted at 100° C. for five hours, and 65 parts of monoisocyanate, which was an addition product of 2,4-tolylene diisocyanate having an NCO (isocyanate) percentage of 13% and octyl alcohol, was added for reaction at 60° C. for five hours to yield a modified epoxy resin $A_2$ having a resin content of 40%.

(3) Modified Epoxy Resin ($A_3$)

A reaction vessel equipped with a condenser, a stirrer and a thermometer was charged with 500 parts of a bisphenol A epoxy resin having an epoxy equivalent of 2500, 385 parts of xylene and 385 parts of cyclohexanone, and they were heated under stirring to form a solution. Five parts of monoethanolamine was added, and 7.6 parts of dibutylphosphoric acid was also added, for reaction at 100° C. for five hours to yield a modified epoxy resin $A_3$ having a resin content of 40%.

(4) Blocked Urethane (B)

A reaction vessel equipped with a condenser, a stirrer and a thermometer was charged with 440 parts of polyethylene glycol having a molecular weight of 1000 and 125 parts of xylene, and while they were heated at 60° C. under stirring, 153 parts of 2,6-tolylene diisocyanate was added, whereby an intermediate having an NCO percentage of 4.8% was obtained. Then, 106 parts of ε-caprolactam was added to continue the reaction, and after it had been ascertained that the reaction product has an NCO percentage of 0%, 175 parts of butanol was added, whereby a blocked urethane B1 having a resin content of 70% was obtained.

The same apparatus and reaction conditions were employed to form an intermediate having an NCO percentage of 1.2% from 500 parts of polypropylene glycol having a molecular weight of 4000, 300 parts of xylene and 42 parts of hexamethylene diisocyanate. Then, 23 parts of methylethyl ketooxime was added to continue the reaction, and after it had been ascertained that the reaction product had an NCO percentage of 0%, 77 parts of butanol was added, whereby a blocked urethane B2 having a resin content of 60% was obtained.

The silica added to the organic films is shown in TABLE 5, and the sparingly soluble chromate in TABLE 6.

TABLES 7 to 18 show the details in construction of the coated steel strips prepared as hereinabove described, and the results of their evaluation for corrosion resistance (cosmetic corrosion resistance), image clarity, paint adhesion, and weldability. The evaluation for each property was made by the method described below.

(a) Corrosion Resistance (cosmetic corrosion resistance)

Each test specimen was prepared by coating a cationic electrodeposition primer of U-600, product of Nippon Paint Co., Ltd., with a thickness of 25 microns, a sealer of KPX-36, product of Kansai Paint Co., Ltd., with a thickness of 30 microns, and a top coat LUGA BAKE B-531, product of Kansai Paint Co., Ltd., with a thickness of 35 microns. A cross cut was made in the specimen with a knife, and the specimen was given 300 or 400 cycles of a cyclic corrosion test, each cycle consisting of 10 minutes of a salt spray test, 155 minutes of drying, 75 minutes of a humidity cabinet test, 160 minutes of drying and 80 minutes of another humidity cabinet test. The creepage width from the cross cut in each specimen was determined as a measure of its corrosion resistance (cosmetic corrosion resistance). The results of evaluation are shown by symbols each representing a certain range of width as indicated below:

⊚: Less than 2 mm:
◯: From 2 mm, inclusive, to less than 4 mm;
△: From 4 mm, inclusive, to less than 6 mm;
x: 6 mm or more.

(b) Image Clarity

An image clarity measuring instrument (ICM-2DP) made by Suga Testing Machine Co., Ltd. was employed for forming an image through a 0.5 mm wide slit on each specimen having an cationic E-coat, a sealer and a top coat formed thereof as described at (a) above, and measuring the clarity C of the image. The results are shown by symbols each representing a certain range of clarity as indicated below:

⊚: 80 or more;
◯: From 75, inclusive, to less than 80;
△: From 70, inclusive, to less than 75;
x: Less than 70.

(c) Paint Adhesion

Each specimen having an cationic E-coat, an sealer and a top coat formed thereon as described at (a) above was immersed in ion-exchange water having a temperature of 40° C., and was removed from it after 240 hours. After it had been left to stand at room temperature for 24 hours, 100 checkers each measuring 2 mm square were made in the coating and an adhesive tape was attached to, and detached from the coating to evaluate it for its adhesive strength. The results are shown by symbols each representing the percentage of the coating which peeled off with the adhesive tape:

⊚: No peeling occurred;
◯: Less than 3% of the coating peeled off;
△: From 3%, inclusive, to less than 10% of the coating peeled off;
x: 10% or more of the coating peeled off.

(d) Weldability

A continuous spot-welding test was made on each specimen by employing a CF electrode, a electrode force of 200 kgf, a weld time of 10 cycles/50 Hz, and a welding current of 10 kA, and the number of the spots which could be made continuously on the specimen was counted as a measure of its weldability. The results are shown by symbols each representing a certain range of the number of spots as indicated below:

⊚: 5000 or more;
◯: From 4000, inclusive, to less than 5000;
△: From 3000, inclusive, to less than 4000;
x: Less than 3000.

The following is an explanation of what is meant by *1 to *8 in TABLES 7 to 18:

*1: "Inv." means an example of this invention, while "Com." means a comparative example;
*2: The numbers correspond to those appearing in TABLE 1 as identifying the plated steel strips;
*3: Each number represents the coating weight of the chromate in terms of metallic chromium;
*4: The numbers correspond to those appearing in TABLES 2 to 4 as identifying the organic resins;
*5: The numbers correspond to those appearing in TABLE 5 as identifying the silica;
*6: The numbers correspond to those appearing in TABLE 6 as identifying the sparingly soluble chromic acid salts;
*7: The numbers represent the ratio by weight of nonvolatile matter;
*8: The numbers represent the ratio by weight of nonvolatile matter.

TABLE 1

| No. | Plated Steel Shoot |
|---|---|
| 1 | Zn-12% Ni alloy electroplated steel sheet (coating weight: 30 g/m$^2$) |
| 2 | Zn-15% Fe alloy electroplated steel sheet (coating weight: 40 g/m$^2$) |
| 3 | Electrogalvanized steel sheet (coating weight: 40 g/m$^2$) |
| 4 | Hot-dipped galvanized steel sheet (coating weight: 90 g/m$^2$) |
| 5 | Galvannealed steel sheet (coating weight: 60 g/m$^2$) |
| 6 | Two layer galvannealed steel sheet (coating weight: 30 g/m$^2$) |

TABLE 1-continued

| No. | Plated Steel Shoot |
|---|---|
| 7 | Zn-5% Al-0.5% Mo alloy plated steel sheet made by hot dipping (coating weight: 90 g/m$^2$) |
| 8 | Zn-60% Mn alloy electroplated steel sheet (coating weight: 30 g/m$^2$) |

TABLE 2

| No. | Modified epoxy resin (A$_1$) | Blocked urethane (B) | A/B |
|---|---|---|---|
| 1 | Modified epoxy resin A$_1$ | Blocked urethane B1 | 95/5 |
| 2 | Modified epoxy resin A$_1$ | Blocked urethane B1 | 90/10 |
| 3 | Modified epoxy resin A$_1$ | Blocked urethane B1 | 70/30 |
| 4 | Modified epoxy resin A$_1$ | Blocked urethane B1 | 60/40 |
| 5 | Modified epoxy resin A$_1$ | Blocked urethane B1 | 50/50 |
| 6 | Modified epoxy resin A$_1$ | Blocked urethane B2 | 95/5 |
| 7 | Modified epoxy resin A$_1$ | Blocked urethane B2 | 90/10 |
| 8 | Modified epoxy resin A$_1$ | Blocked urethane B2 | 70/30 |
| 9 | Modified epoxy resin A$_1$ | Blocked urethane B2 | 60/40 |
| 10 | Modified epoxy resin A$_1$ | Blocked urethane B2 | 50/50 |
| 11 | Modified epoxy resin A$_1$ | Blocked urethane B1 | 97/3 |
| 12 | Modified epoxy resin A$_1$ | Blocked urethane B1 | 45/55 |
| 13 | Modified epoxy resin A$_1$ | Blocked urethane B2 | 97/3 |
| 14 | Modified epoxy resin A$_1$ | Blocked urethane B2 | 45/55 |

TABLE 3

| No. | Modified epoxy resin (A$_1$) | Blocked urethane (B) | A/B |
|---|---|---|---|
| 15 | Modified epoxy resin A$_2$ | Blocked urethane B1 | 95/5 |
| 15 | Modified epoxy resin A$_2$ | Blocked urethane B1 | 90/10 |
| 16 | Modified epoxy resin A$_2$ | Blocked urethane B1 | 70/30 |
| 17 | Modified epoxy resin A$_2$ | Blocked urethane B1 | 60/40 |
| 18 | Modified epoxy resin A$_2$ | Blocked urethane B1 | 50/50 |
| 19 | Modified epoxy resin A$_2$ | Blocked urethane B2 | 95/5 |
| 20 | Modified epoxy resin A$_2$ | Blocked urethane B2 | 90/10 |
| 21 | Modified epoxy resin A$_2$ | Blocked urethane B2 | 70/30 |
| 22 | Modified epoxy resin A$_2$ | Blocked urethane B2 | 60/40 |
| 23 | Modified epoxy resin A$_2$ | Blocked urethane B2 | 50/50 |
| 24 | Modified epoxy resin A$_2$ | Blocked urethane B1 | 97/3 |
| 25 | Modified epoxy resin A$_2$ | Blocked urethane B1 | 45/55 |
| 26 | Modified epoxy resin A$_2$ | Blocked urethane B2 | 97/3 |
| 27 | Modified epoxy resin A$_2$ | Blocked urethane B2 | 45/55 |

TABLE 4

| No. | Modified epoxy resin (A$_1$) | Blocked urethane (B) | A/B |
|---|---|---|---|
| 29 | Modified epoxy resin A$_3$ | Blocked urethane B1 | 95/5 |
| 30 | Modified epoxy resin A$_3$ | Blocked urethane B1 | 90/10 |
| 31 | Modified epoxy resin A$_3$ | Blocked urethane B1 | 70/30 |
| 32 | Modified epoxy resin A$_3$ | Blocked urethane B1 | 60/40 |
| 33 | Modified epoxy resin A$_3$ | Blocked urethane B1 | 50/50 |
| 34 | Modified epoxy resin A$_3$ | Blocked urethane B2 | 95/5 |
| 35 | Modified epoxy resin A$_3$ | Blocked urethane B2 | 90/10 |
| 36 | Modified epoxy resin A$_3$ | Blocked urethane B2 | 70/30 |
| 37 | Modified epoxy resin A$_3$ | Blocked urethane B2 | 60/40 |
| 38 | Modified epoxy resin A$_3$ | Blocked urethane B2 | 50/50 |
| 39 | Modified epoxy resin A$_3$ | Blocked urethane B1 | 97/3 |
| 40 | Modified epoxy resin A$_3$ | Blocked urethane B1 | 45/55 |
| 41 | Modified epoxy resin A$_3$ | Blocked urethane B2 | 97/3 |
| 42 | Modified epoxy resin A$_3$ | Blocked urethane B2 | 45/55 |
| 43 | Amine-modified epoxy resin (Japanese Patent Application laid open under No. Sho 64-8033, Table 3 No. 2) | | |

TABLE 5

| No. | Name |
|---|---|
| 1 | AEROSIL 200 made by Nippon Aerosil Co., Ltd. (silica obtained by a dry process) |
| 2 | AEROSIL 380 made by Nippon Aerosil Co., Ltd. (silica obtained by a dry process) |
| 3 | AEROSIL R974 made by Nippon Aerosil Co., Ltd. (silica obtained by a dry process) |
| 4 | ETC-ST made by Nissan Chemical Industries, Ltd. (organoisilica sol) |
| 5 | Fine Seal T-32(S) made by Tokuyama Soda Co., Ltd. (silica obtained by a wet process of sedimentation) |
| 6 | Syloid 244 made by Fuji-Davison Chemical, Ltd. (silica obtained by a wet process of gelling) |
| 7 | SHIELDEX made by Fuji-Davison Chemical, Ltd. (calcium-exchanged silica) |

TABLE 6

| No. | Name |
|---|---|
| 1 | Barium chromate made by Kikuchi Pigment Industrial Co., Ltd. |
| 2 | Strontium chromate made by Kikuchi Pigment Industrial Co., Ltd. |
| 3 | Calcium chromate made by Kikuchi Pigment Industrial Co., Ltd. |
| 4 | Zinc chromate (ZTO) made by Kikuchi Pigment Industrial Co., Ltd. |
| 5 | Potassium zinc chromate (ZPC) made by Kikuchi Pigment Industrial Co., Ltd. |

TABLE 7

| No. | Division *1 | Base material *2 | Chromate film Forming method | Chromate film Weight (mg/m$^2$) *3 | Organic film Organic resin *4 | Organic film Silica *5 | Organic film Chromate *6 | Organic film Resin/(silica + chromate) *7 | Organic film Silica/chromate *8 | Thickness (μm) |
|---|---|---|---|---|---|---|---|---|---|---|
| 1 | Inv. | 1 | Dried-in-place | 50 | 3 | 1 | 1 | 60/40 | 75/25 | 0.8 |
| 2 | Inv. | 2 | Dried-in-place | 50 | 3 | 1 | 1 | 60/40 | 75/25 | 0.8 |
| 3 | Inv. | 3 | Dried-in-place | 50 | 3 | 1 | 1 | 60/40 | 75/25 | 0.8 |
| 4 | Inv. | 4 | Dried-in-place | 50 | 3 | 1 | 1 | 60/40 | 75/25 | 0.8 |
| 5 | Inv. | 5 | Dried-in-place | 50 | 3 | 1 | 1 | 60/40 | 75/25 | 0.8 |
| 6 | Inv. | 6 | Dried-in-place | 50 | 3 | 1 | 1 | 60/40 | 75/25 | 0.8 |
| 7 | Inv. | 7 | Dried-in-place | 50 | 3 | 1 | 1 | 60/40 | 75/25 | 0.8 |
| 8 | Inv. | 8 | Dried-in-place | 50 | 3 | 1 | 1 | 60/40 | 75/25 | 0.8 |
| 9 | Inv. | 9 | Electrolytic | 50 | 3 | 1 | 1 | 60/40 | 75/25 | 0.8 |
| 10 | Inv. | 1 | Reacted-in-place | 50 | 3 | 1 | 1 | 60/40 | 75/25 | 0.8 |
| 11 | Com. | 1 | Dried-in-place | 5 | 3 | 1 | 1 | 60/40 | 75/25 | 0.8 |

TABLE 7-continued

| No. | Division *1 | Base material *2 | Forming method | Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 12 | Inv. | 1 | Dried-in-place | 10 | 3 | 1 | 1 | 60/40 | 75/25 | 0.8 |
| 13 | Inv. | 1 | Dried-in-place | 20 | 3 | 1 | 1 | 60/40 | 75/25 | 0.8 |
| 14 | Inv. | 1 | Dried-in-place | 100 | 3 | 1 | 1 | 60/40 | 75/25 | 0.8 |
| 15 | Inv. | 1 | Dried-in-place | 200 | 3 | 1 | 1 | 60/40 | 75/25 | 0.8 |

| No. | Corrosion resistance 300 cycles | Corrosion resistance 400 cycles | Image clarity | Adhesion | Weld-ability |
|---|---|---|---|---|---|
| 1 | ⊚ | ○ | ⊚ | ⊚ | ⊚ |
| 2 | ⊚ | ○ | ⊚ | ⊚ | ⊚ |
| 3 | ⊚ | ○ | ⊚ | ⊚ | ○ |
| 4 | ⊚ | ○ | ○ | ⊚ | △ |
| 5 | ⊚ | ○ | ○ | ⊚ | ○ |
| 6 | ⊚ | ○ | ⊚ | ⊚ | ⊚ |
| 7 | ⊚ | ○ | ○ | ⊚ | △ |
| 8 | ⊚ | ○ | ⊚ | ⊚ | ⊚ |
| 9 | ○ | △ | ⊚ | ⊚ | ⊚ |
| 10 | ○ | △ | ⊚ | ⊚ | ⊚ |
| 11 | △ | X | ⊚ | ⊚ | ⊚ |
| 12 | ○ | △ | ⊚ | ⊚ | ⊚ |
| 13 | ⊚ | ○ | ⊚ | ⊚ | ⊚ |
| 14 | ⊚ | ○ | ⊚ | ⊚ | ⊚ |
| 15 | ⊚ | ○ | ⊚ | ⊚ | ○ |

TABLE 8

| No. | Division *1 | Base material *2 | Chromate film Forming method | Chromate film Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 16 | Com. | 1 | Dried-in-place | 300 | 3 | 1 | 1 | 60/40 | 75/25 | 0.8 |
| 17 | Inv. | 1 | Dried-in-place | 50 | 1 | 1 | 1 | 60/40 | 75/25 | 0.8 |
| 18 | Inv. | 1 | Dried-in-place | 50 | 2 | 1 | 1 | 60/40 | 75/25 | 0.8 |
| 19 | Inv. | 1 | Dried-in-place | 50 | 4 | 1 | 1 | 60/40 | 75/25 | 0.8 |
| 20 | Inv. | 1 | Dried-in-place | 50 | 5 | 1 | 1 | 60/40 | 75/25 | 0.8 |
| 21 | Inv. | 1 | Dried-in-place | 50 | 6 | 1 | 1 | 60/40 | 75/25 | 0.8 |
| 22 | Inv. | 1 | Dried-in-place | 50 | 7 | 1 | 1 | 60/40 | 75/25 | 0.8 |
| 23 | Inv. | 1 | Dried-in-place | 50 | 8 | 1 | 1 | 60/40 | 75/25 | 0.8 |
| 24 | Inv. | 1 | Dried-in-place | 50 | 9 | 1 | 1 | 60/40 | 75/25 | 0.8 |
| 25 | Inv. | 1 | Dried-in-place | 50 | 10 | 1 | 1 | 60/40 | 75/25 | 0.8 |
| 26 | Com. | 1 | Dried-in-place | 50 | 3 | 11 | 1 | 60/40 | 75/25 | 0.8 |
| 27 | Com. | 1 | Dried-in-place | 50 | 12 | 1 | 1 | 60/40 | 75/25 | 0.8 |
| 28 | Com. | 1 | Dried-in-place | 50 | 13 | 1 | 1 | 60/40 | 75/25 | 0.8 |
| 29 | Com. | 1 | Dried-in-place | 50 | 14 | 1 | 1 | 60/40 | 75/25 | 0.8 |
| 30 | Com. | 1 | Dried-in-place | 50 | 43 | 1 | 1 | 60/40 | 75/25 | 0.8 |

| No. | Corrosion resistance 300 cycles | Corrosion resistance 400 cycles | Image clarity | Adhesion | Weld-ability |
|---|---|---|---|---|---|
| 16 | ⊚ | ○ | ⊚ | ⊚ | X |
| 17 | ⊚ | ○ | ○ | ⊚ | ⊚ |
| 18 | ⊚ | ○ | ⊚ | ⊚ | ⊚ |
| 19 | ⊚ | ○ | ⊚ | ⊚ | ⊚ |
| 20 | ○ | △ | ⊚ | ⊚ | ⊚ |
| 21 | ⊚ | ○ | ○ | ⊚ | ⊚ |
| 22 | ⊚ | ○ | ⊚ | ⊚ | ⊚ |
| 23 | ⊚ | ○ | ⊚ | ⊚ | ⊚ |
| 24 | ⊚ | ○ | ⊚ | ⊚ | ⊚ |

TABLE 8-continued

| | | |
|---|---|---|
| 25 | ○ | △ | ⊙ | ⊙ | ⊙ |
| 26 | ⊙ | △ | X~△ | ⊙ | ⊙ |
| 27 | X~△ | X | ⊙ | ⊙ | ⊙ |
| 28 | ⊙ | △ | X~△ | ⊙ | ⊙ |
| 29 | X~△ | X | ⊙ | ⊙ | ⊙ |
| 30 | ○ | △ | X~△ | ⊙ | ⊙ |

TABLE 9

| No. | Divi-sion *1 | Base material *2 | Chromate film | | Organic film | | | | | Thickness (μm) |
|---|---|---|---|---|---|---|---|---|---|---|
| | | | Forming method | Weight (mg/m$^2$) *3 | Organic resin *4 | Silica *5 | Chromate *6 | Resin/(silica + chromate) *7 | Silica/chromate *8 | |
| 31 | Inv. | 1 | Dried-in-place | 50 | 3 | 2 | 1 | 60/40 | 75/25 | 0.8 |
| 32 | Inv. | 1 | Dried-in-place | 50 | 3 | 3 | 1 | 60/40 | 75/25 | 0.8 |
| 33 | Inv. | 1 | Dried-in-place | 50 | 3 | 4 | 1 | 60/40 | 75/25 | 0.8 |
| 34 | Inv. | 1 | Dried-in-place | 50 | 3 | 5 | 1 | 60/40 | 75/25 | 0.8 |
| 35 | Inv. | 1 | Dried-in-place | 50 | 3 | 6 | 1 | 60/40 | 75/25 | 0.8 |
| 36 | Inv. | 1 | Dried-in-place | 50 | 3 | 7 | 1 | 60/40 | 75/25 | 0.8 |
| 37 | Inv. | 1 | Dried-in-place | 50 | 3 | 1 | 2 | 60/40 | 75/25 | 0.8 |
| 38 | Inv. | 1 | Dried-in-place | 50 | 3 | 1 | 3 | 60/40 | 75/25 | 0.8 |
| 39 | Inv. | 1 | Dried-in-place | 50 | 3 | 1 | 4 | 60/40 | 75/25 | 0.8 |
| 40 | Inv. | 1 | Dried-in-place | 50 | 3 | 1 | 5 | 60/40 | 75/25 | 0.8 |
| 41 | Inv. | 1 | Dried-in-place | 50 | 3 | 1 | 1 | 90/10 | 75/25 | 0.8 |
| 42 | Inv. | 1 | Dried-in-place | 50 | 3 | 1 | 1 | 40/60 | 75/25 | 0.8 |
| 43 | Com. | 1 | Dried-in-place | 50 | 3 | 1 | 1 | 95/5 | 75/25 | 0.8 |
| 44 | Com. | 1 | Dried-in-place | 50 | 3 | 1 | 1 | 30/70 | 75/25 | 0.8 |
| 45 | Inv. | 1 | Dried-in-place | 50 | 3 | 1 | 1 | 60/40 | 90/10 | 0.8 |

| No. | Corrosion resistance | | Image clarity | Adhesion | Weld-ability |
|---|---|---|---|---|---|
| | 300 cycles | 400 cycles | | | |
| 31 | ⊙ | ○ | ⊙ | ⊙ | ⊙ |
| 32 | ⊙ | ○ | △ | ⊙ | ⊙ |
| 33 | ⊙ | △ | ⊙ | ⊙ | ⊙ |
| 34 | ⊙ | ○ | ⊙ | ⊙ | ⊙ |
| 35 | ⊙ | ○ | ⊙ | ⊙ | ⊙ |
| 36 | ⊙ | ○ | △ | ⊙ | ⊙ |
| 37 | ⊙ | ○ | ○~⊙ | ⊙ | ⊙ |
| 38 | ⊙ | ○ | ○ | ⊙ | ⊙ |
| 39 | ⊙ | ○ | ○ | ⊙ | ⊙ |
| 40 | ⊙ | ○ | ○ | ⊙ | ⊙ |
| 41 | ⊙ | ○ | ⊙ | ⊙ | ⊙ |
| 42 | ⊙ | ○ | ⊙ | ⊙ | ⊙ |
| 43 | △ | X | ⊙ | ⊙ | ⊙ |
| 44 | ⊙ | ○ | ⊙ | X | ⊙ |
| 45 | ⊙ | ○ | ⊙ | ⊙ | ⊙ |

TABLE 10

| No. | Divi-sion *1 | Base material *2 | Chromate film | | Organic film | | | | | Thickness (μm) |
|---|---|---|---|---|---|---|---|---|---|---|
| | | | Forming method | Weight (mg/m$^2$) *3 | Organic resin *4 | Silica *5 | Chromate *6 | Resin/(silica + chromate) *7 | Silica/chromate *8 | |
| 46 | Inv. | 1 | Dried-in-place | 50 | 3 | 1 | 1 | 60/40 | 10/90 | 0.8 |
| 47 | Inv. | 1 | Dried-in-place | 50 | 3 | 1 | — | 60/40 | 100/0 | 0.8 |
| 48 | Inv. | 1 | Dried-in-place | 50 | 3 | — | 1 | 60/40 | 0/100 | 0.8 |

TABLE 10-continued

| No. | Division | Base material | Forming method | Weight (mg/m²) | Organic resin | Silica | Chromate | Resin/(silica + chromate) | Silica/chromate | Thickness (μm) |
|---|---|---|---|---|---|---|---|---|---|---|
| 49 | Inv. | 1 | Dried-in-place | 50 | 3 | 1 | 1 | 60/40 | 75/25 | 0.2 |
| 50 | Inv. | 1 | Dried-in-place | 50 | 3 | 1 | 1 | 60/40 | 75/25 | 0.3 |
| 51 | Inv. | 1 | Dried-in-place | 50 | 3 | 1 | 1 | 60/40 | 75/25 | 1.5 |
| 52 | Inv. | 1 | Dried-in-place | 50 | 3 | 1 | 1 | 60/40 | 75/25 | 2.0 |
| 53 | Com. | 1 | Dried-in-place | 50 | 3 | 1 | 1 | 60/40 | 75/25 | 0.1 |
| 54 | Com. | 1 | Dried-in-place | 50 | 3 | 1 | 1 | 60/40 | 75/25 | 2.5 |

| No. | Corrosion resistance 300 cycles | Corrosion resistance 400 cycles | Image clarity | Adhesion | Weldability |
|---|---|---|---|---|---|
| 46 | ⊙ | ○ | ⊙ | ⊙ | ⊙ |
| 47 | ○ | Δ | ⊙ | ⊙ | ⊙ |
| 48 | ○ | Δ | ⊙ | ⊙ | ⊙ |
| 49 | ○ | Δ | ⊙ | ⊙ | ⊙ |
| 50 | ⊙ | ○ | ⊙ | ⊙ | ⊙ |
| 51 | ⊙ | ○ | ⊙ | ⊙ | ⊙ |
| 52 | ⊙ | ○ | ⊙ | ⊙ | ○ |
| 53 | X | X | ⊙ | ⊙ | ⊙ |
| 54 | ⊙ | ○ | ⊙ | ⊙ | X |

TABLE 11

| No. | Division *1 | Base material *2 | Chromate film Forming method | Chromate film Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 55 | Inv. | 1 | Dried-in-place | 50 | 17 | 1 | 1 | 60/40 | 75/25 | 0.8 |
| 56 | Inv. | 2 | Dried-in-place | 50 | 17 | 1 | 1 | 60/40 | 75/25 | 0.8 |
| 57 | Inv. | 3 | Dried-in-place | 50 | 17 | 1 | 1 | 60/40 | 75/25 | 0.8 |
| 58 | Inv. | 4 | Dried-in-place | 50 | 17 | 1 | 1 | 60/40 | 75/25 | 0.8 |
| 59 | Inv. | 5 | Dried-in-place | 50 | 17 | 1 | 1 | 60/40 | 75/25 | 0.8 |
| 60 | Inv. | 6 | Dried-in-place | 50 | 17 | 1 | 1 | 60/40 | 75/25 | 0.8 |
| 61 | Inv. | 7 | Dried-in-place | 50 | 17 | 1 | 1 | 60/40 | 75/25 | 0.8 |
| 62 | Inv. | 8 | Dried-in-place | 50 | 17 | 1 | 1 | 60/40 | 75/25 | 0.8 |
| 63 | Inv. | 1 | Electrolytic | 50 | 17 | 1 | 1 | 60/40 | 75/25 | 0.8 |
| 64 | Inv. | 1 | Reacted-in-place | 50 | 17 | 1 | 1 | 60/40 | 75/25 | 0.8 |
| 65 | Com. | 1 | Dried-in-place | 5 | 17 | 1 | 1 | 60/40 | 75/25 | 0.8 |
| 66 | Inv. | 1 | Dried-in-place | 10 | 17 | 1 | 1 | 60/40 | 75/25 | 0.8 |
| 67 | Inv. | 1 | Dried-in-place | 20 | 17 | 1 | 1 | 60/40 | 75/25 | 0.8 |
| 68 | Inv. | 1 | Dried-in-place | 100 | 17 | 1 | 1 | 60/40 | 75/25 | 0.8 |
| 69 | Inv. | 1 | Dried-in-place | 200 | 17 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 55 | ⊙ | ⊙ | ⊙ | ⊙ | ⊙ |
| 56 | ⊙ | ⊙ | ⊙ | ⊙ | ⊙ |
| 57 | ⊙ | ⊙ | ⊙ | ⊙ | ○ |
| 58 | ⊙ | ⊙ | ○ | ⊙ | Δ |
| 59 | ⊙ | ⊙ | ○ | ⊙ | ○ |
| 60 | ⊙ | ⊙ | ⊙ | ⊙ | ⊙ |
| 61 | ⊙ | ⊙ | ○ | ⊙ | Δ |
| 62 | ⊙ | ⊙ | ⊙ | ⊙ | ⊙ |
| 63 | ○ | ○ | ⊙ | ⊙ | ⊙ |
| 64 | ○ | ○ | ⊙ | ⊙ | ⊙ |
| 65 | Δ | Δ | ⊙ | ⊙ | ⊙ |

TABLE 11-continued

| | | | | | |
|---|---|---|---|---|---|
| 66 | ○ | ○ | ◎ | ◎ | ◎ |
| 67 | ◎ | ◎ | ◎ | ◎ | ◎ |
| 68 | ◎ | ◎ | ◎ | ◎ | ◎ |
| 69 | ◎ | ◎ | ◎ | ◎ | ○ |

TABLE 12

| | | | Chromate film | | Organic film | | | | | |
|---|---|---|---|---|---|---|---|---|---|---|
| No. | Division *1 | Base material *2 | Forming method | Weight (mg/m$^2$) *3 | Organic resin *4 | Silica *5 | Chromate *6 | Resin/ (silica + chromate) *7 | Silica/ chromate *8 | Thickness (μm) |
| 70 | Com. | 1 | Dried-in-place | 300 | 17 | 1 | 1 | 60/40 | 75/25 | 0.8 |
| 71 | Inv. | 1 | Dried-in-place | 50 | 15 | 1 | 1 | 60/40 | 75/25 | 0.8 |
| 72 | Inv. | 1 | Dried-in-place | 50 | 16 | 1 | 1 | 60/40 | 75/25 | 0.8 |
| 73 | Inv. | 1 | Dried-in-place | 50 | 18 | 1 | 1 | 60/40 | 75/25 | 0.8 |
| 74 | Inv. | 1 | Dried-in-place | 50 | 19 | 1 | 1 | 60/40 | 75/25 | 0.8 |
| 75 | Inv. | 1 | Dried-in-place | 50 | 20 | 1 | 1 | 60/40 | 75/25 | 0.8 |
| 76 | Inv. | 1 | Dried-in-place | 50 | 21 | 1 | 1 | 60/40 | 75/25 | 0.8 |
| 77 | Inv. | 1 | Dried-in-place | 50 | 22 | 1 | 1 | 60/40 | 75/25 | 0.8 |
| 78 | Inv. | 1 | Dried-in-place | 50 | 23 | 1 | 1 | 60/40 | 75/25 | 0.8 |
| 79 | Inv. | 1 | Dried-in-place | 50 | 24 | 1 | 1 | 60/40 | 75/25 | 0.8 |
| 80 | Com. | 1 | Dried-in-place | 50 | 25 | 1 | 1 | 60/40 | 75/25 | 0.8 |
| 81 | Com. | 1 | Dried-in-place | 50 | 28 | 1 | 1 | 60/40 | 75/25 | 0.8 |
| 82 | Com. | 1 | Dried-in-place | 50 | 27 | 1 | 1 | 60/40 | 75/25 | 0.8 |
| 83 | Com. | 1 | Dried-in-place | 50 | 28 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 70 | ◎ | ◎ | ◎ | ◎ | X |
| 71 | ◎ | ◎ | ○ | ◎ | ◎ |
| 72 | ◎ | ◎ | ◎ | ◎ | ◎ |
| 73 | ◎ | ◎ | ◎ | ◎ | ◎ |
| 74 | ○ | ○ | ◎ | ◎ | ◎ |
| 75 | ◎ | ◎ | ○ | ◎ | ◎ |
| 76 | ◎ | ◎ | ◎ | ◎ | ◎ |
| 77 | ◎ | ◎ | ◎ | ◎ | ◎ |
| 78 | ◎ | ◎ | ◎ | ◎ | ◎ |
| 79 | ○ | ○ | ◎ | ◎ | ◎ |
| 80 | ◎ | ◎ | X~Δ | ◎ | ◎ |
| 81 | X~Δ | X | ◎ | ◎ | ◎ |
| 82 | ◎ | ◎ | X~Δ | ◎ | ◎ |
| 83 | X~Δ | X | ◎ | ◎ | ◎ |

TABLE 13

| | | | Chromate film | | Organic film | | | | | |
|---|---|---|---|---|---|---|---|---|---|---|
| No. | Division *1 | Base material *2 | Forming method | Weight (mg/m$^2$) *3 | Organic resin *4 | Silica *5 | Chromate *6 | Resin/ (silica + chromate) *7 | Silica/ chromate *8 | Thickness (μm) |
| 84 | Inv. | 1 | Dried-in-place | 50 | 17 | 2 | 1 | 60/40 | 75/25 | 0.8 |
| 85 | Inv. | 1 | Dried-in-place | 50 | 17 | 3 | 1 | 60/40 | 75/25 | 0.8 |
| 86 | Inv. | 1 | Dried-in-place | 50 | 17 | 4 | 1 | 60/40 | 75/25 | 0.8 |
| 87 | Inv. | 1 | Dried-in-place | 50 | 17 | 5 | 1 | 60/40 | 75/25 | 0.8 |
| 88 | Inv. | 1 | Dried-in-place | 50 | 17 | 6 | 1 | 60/40 | 75/25 | 0.8 |
| 89 | Inv. | 1 | Dried-in- | 50 | 17 | 7 | 1 | 60/40 | 75/25 | 0.8 |

TABLE 13-continued

| No. | Division *1 | Base material *2 | Forming method | Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 90 | Inv. | 1 | Dried-in-place | 50 | 17 | 1 | 2 | 60/40 | 75/25 | 0.8 |
| 91 | Inv. | 1 | Dried-in-place | 50 | 17 | 1 | 3 | 60/40 | 75/25 | 0.8 |
| 92 | Inv. | 1 | Dried-in-place | 50 | 17 | 1 | 4 | 60/40 | 75/25 | 0.8 |
| 93 | Inv. | 1 | Dried-in-place | 50 | 17 | 1 | 5 | 60/40 | 75/25 | 0.8 |
| 94 | Inv. | 1 | Dried-in-place | 50 | 17 | 1 | 1 | 90/10 | 75/25 | 0.8 |
| 95 | Inv. | 1 | Dried-in-place | 50 | 17 | 1 | 1 | 40/60 | 75/25 | 0.8 |
| 96 | Com. | 1 | Dried-in-place | 50 | 17 | 1 | 1 | 95/5 | 75/25 | 0.8 |
| 97 | Com. | 1 | Dried-in-place | 50 | 17 | 1 | 1 | 30/70 | 75/25 | 0.8 |
| 98 | Inv. | 1 | Dried-in-place | 50 | 17 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 84 | ⊙ | ⊙ | ⊙ | ⊙ | ⊙ |
| 85 | ⊙ | ⊙ | Δ | ⊙ | ⊙ |
| 86 | ○ | ○ | ⊙ | ⊙ | ⊙ |
| 87 | ⊙ | ⊙ | ⊙ | ⊙ | ⊙ |
| 88 | ⊙ | ⊙ | ⊙ | ⊙ | ⊙ |
| 89 | ⊙ | ⊙ | Δ | ⊙ | ⊙ |
| 90 | ⊙ | ⊙ | ○~⊙ | ⊙ | ⊙ |
| 91 | ⊙ | ⊙ | ○ | ⊙ | ⊙ |
| 92 | ⊙ | ⊙ | ○ | ⊙ | ⊙ |
| 93 | ⊙ | ⊙ | ○ | ⊙ | ⊙ |
| 94 | ⊙ | ⊙ | ⊙ | ⊙ | ⊙ |
| 95 | ⊙ | ⊙ | ⊙ | ⊙ | ⊙ |
| 96 | Δ | Δ | ⊙ | ⊙ | ⊙ |
| 97 | ⊙ | ⊙ | ⊙ | X | ⊙ |
| 98 | ⊙ | ⊙ | ⊙ | ⊙ | ⊙ |

TABLE 14

| No. | Division *1 | Base material *2 | Forming method | Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 99 | Inv. | 1 | Dried-in-place | 50 | 17 | 1 | 1 | 60/40 | 10/90 | 0.8 |
| 100 | Inv. | 1 | Dried-in-place | 50 | 17 | 1 | — | 60/40 | 100/0 | 0.8 |
| 101 | Inv. | 1 | Dried-in-place | 50 | 17 | — | 1 | 60/40 | 0/100 | 0.8 |
| 102 | Inv. | 1 | Dried-in-place | 50 | 17 | 1 | 1 | 60/40 | 75/25 | 0.2 |
| 103 | Inv. | 1 | Dried-in-place | 50 | 17 | 1 | 1 | 60/40 | 75/25 | 0.3 |
| 104 | Inv. | 1 | Dried-in-place | 50 | 17 | 1 | 1 | 60/40 | 75/25 | 1.5 |
| 105 | Inv. | 1 | Dried-in-place | 50 | 17 | 1 | 1 | 60/40 | 75/25 | 2.0 |
| 106 | Com. | 1 | Dried-in-place | 50 | 17 | 1 | 1 | 60/40 | 75/25 | 0.1 |
| 107 | Com. | 1 | Dried-in-place | 50 | 17 | 1 | 1 | 60/40 | 75/25 | 2.5 |

| No. | Corrosion resistance 300 cycles | Corrosion resistance 400 cycles | Image clarity | Adhesion | Weldability |
|---|---|---|---|---|---|
| 99 | ⊙ | ⊙ | ⊙ | ⊙ | ⊙ |
| 100 | ○ | ○ | ⊙ | ⊙ | ⊙ |
| 101 | ○ | ○ | ⊙ | ⊙ | ⊙ |
| 102 | ○ | ○ | ⊙ | ⊙ | ⊙ |
| 103 | ⊙ | ⊙ | ⊙ | ⊙ | ⊙ |
| 104 | ⊙ | ⊙ | ⊙ | ⊙ | ⊙ |
| 105 | ⊙ | ⊙ | ⊙ | ⊙ | ○ |
| 106 | X | X | ⊙ | ⊙ | ⊙ |

TABLE 14-continued

| | | | | | | |
|---|---|---|---|---|---|---|
| | 107 | ⊙ | ⊙ | ⊙ | ⊙ | X |

TABLE 15

| No. | Division *1 | Base material *2 | Chromate film Forming method | Chromate film Weight (mg/m²) *3 | Organic film Organic resin *4 | Organic film Silica *5 | Organic film Chromate *6 | Organic film Resin/ (silica + chromate) *7 | Organic film Silica/ chromate *8 | Organic film Thickness (μm) |
|---|---|---|---|---|---|---|---|---|---|---|
| 108 | Inv. | 1 | Dried-in-place | 50 | 31 | 2 | 1 | 60/40 | 75/25 | 0.8 |
| 109 | Inv. | 2 | Dried-in-place | 50 | 31 | 1 | 1 | 60/40 | 75/25 | 0.8 |
| 110 | Inv. | 3 | Dried-in-place | 50 | 31 | 1 | 1 | 60/40 | 75/25 | 0.8 |
| 111 | Inv. | 4 | Dried-in-place | 50 | 31 | 1 | 1 | 60/40 | 75/25 | 0.8 |
| 112 | Inv. | 5 | Dried-in-place | 50 | 31 | 1 | 1 | 60/40 | 75/25 | 0.8 |
| 113 | Inv. | 6 | Dried-in-place | 50 | 31 | 1 | 1 | 60/40 | 75/25 | 0.8 |
| 114 | Inv. | 7 | Dried-in-place | 50 | 31 | 1 | 1 | 60/40 | 75/25 | 0.8 |
| 115 | Inv. | 8 | Dried-in-place | 50 | 31 | 1 | 1 | 60/40 | 75/25 | 0.8 |
| 116 | Inv. | 1 | Electrolytic | 50 | 31 | 1 | 1 | 60/40 | 75/25 | 0.8 |
| 117 | Inv. | 1 | Reacted-in-place | 50 | 31 | 1 | 1 | 60/40 | 75/25 | 0.8 |
| 118 | Com. | 1 | Dried-in-place | 5 | 31 | 1 | 1 | 60/40 | 75/25 | 0.8 |
| 119 | Inv. | 1 | Dried-in-place | 10 | 31 | 1 | 1 | 60/40 | 75/25 | 0.8 |
| 120 | Inv. | 1 | Dried-in-place | 20 | 31 | 1 | 1 | 60/40 | 75/25 | 0.8 |
| 121 | Inv. | 1 | Dried-in-place | 100 | 31 | 1 | 1 | 60/40 | 75/25 | 0.8 |
| 122 | Inv. | 1 | Dried-in-place | 200 | 31 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 108 | ⊙ | ⊙ | ⊙ | ⊙ | ⊙ |
| 109 | ⊙ | ⊙ | ⊙ | ⊙ | ⊙ |
| 110 | ⊙ | ○ | ⊙ | ⊙ | ○ |
| 111 | ⊙ | ⊙ | ○ | ⊙ | △ |
| 112 | ⊙ | ⊙ | ○ | ⊙ | ○ |
| 113 | ⊙ | ⊙ | ⊙ | ⊙ | ⊙ |
| 114 | ⊙ | ⊙ | ○ | ⊙ | △ |
| 115 | ⊙ | ○ | ⊙ | ⊙ | ⊙ |
| 116 | ○ | ○ | ⊙ | ⊙ | ⊙ |
| 117 | ○ | ○ | ⊙ | ⊙ | ⊙ |
| 118 | △ | △ | ⊙ | ⊙ | ⊙ |
| 119 | ○ | ○ | ⊙ | ⊙ | ⊙ |
| 120 | ⊙ | ⊙ | ⊙ | ⊙ | ⊙ |
| 121 | ⊙ | ⊙ | ⊙ | ⊙ | ⊙ |
| 122 | ⊙ | ⊙ | ⊙ | ⊙ | ○ |

TABLE 16

| No. | Division *1 | Base material *2 | Chromate film Forming method | Chromate film Weight (mg/m²) *3 | Organic film Organic resin *4 | Organic film Silica *5 | Organic film Chromate *6 | Organic film Resin/ (silica + chromate) *7 | Organic film Silica/ chromate *8 | Organic film Thickness (μm) |
|---|---|---|---|---|---|---|---|---|---|---|
| 123 | Com. | 1 | Dried-in-place | 300 | 31 | 1 | 1 | 60/40 | 75/25 | 0.8 |
| 124 | Inv. | 1 | Dried-in-place | 50 | 29 | 1 | 1 | 60/40 | 75/25 | 0.8 |
| 125 | Inv. | 1 | Dried-in-place | 50 | 30 | 1 | 1 | 60/40 | 75/25 | 0.8 |
| 126 | Inv. | 1 | Dried-in-place | 50 | 32 | 1 | 1 | 60/40 | 75/25 | 0.8 |
| 127 | Inv. | 1 | Dried-in-place | 50 | 33 | 1 | 1 | 60/40 | 75/25 | 0.8 |
| 128 | Inv. | 1 | Dried-in- | 50 | 34 | 1 | 1 | 60/40 | 75/25 | 0.8 |

TABLE 16-continued

| No. | Division *1 | Base material *2 | Forming method | Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 129 | Inv. | 1 | Dried-in-place | 50 | 35 | 1 | 1 | 60/40 | 75/25 | 0.8 |
| 130 | Inv. | 1 | Dried-in-place | 50 | 36 | 1 | 1 | 60/40 | 75/25 | 0.8 |
| 131 | Inv. | 1 | Dried-in-place | 50 | 37 | 1 | 1 | 60/40 | 75/25 | 0.8 |
| 132 | Inv. | 1 | Dried-in-place | 50 | 38 | 1 | 1 | 60/40 | 75/25 | 0.8 |
| 133 | Com. | 1 | Dried-in-place | 50 | 39 | 1 | 1 | 60/40 | 75/25 | 0.8 |
| 134 | Com. | 1 | Dried-in-place | 50 | 40 | 1 | 1 | 60/40 | 75/25 | 0.8 |
| 135 | Com. | 1 | Dried-in-place | 50 | 41 | 1 | 1 | 60/40 | 75/25 | 0.8 |
| 136 | Com. | 1 | Dried-in-place | 50 | 42 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 123 | ⊚ | ⊚ | ⊚ | ⊚ | X |
| 124 | ⊚ | ⊚ | ○ | ⊚ | ⊚ |
| 125 | ⊚ | ⊚ | ⊚ | ⊚ | ○ |
| 126 | ⊚ | ○ | ⊚ | ⊚ | ⊚ |
| 127 | ○ | Δ~○ | ⊚ | ⊚ | ⊚ |
| 128 | ⊚ | ⊚ | ○ | ⊚ | ⊚ |
| 129 | ⊚ | ⊚ | ⊚ | ⊚ | ⊚ |
| 130 | ⊚ | ⊚ | ⊚ | ⊚ | ⊚ |
| 131 | ⊚ | ○ | ⊚ | ⊚ | ⊚ |
| 132 | ○ | Δ~○ | ⊚ | ⊚ | ⊚ |
| 133 | ⊚ | ⊚ | X~Δ | ⊚ | ⊚ |
| 134 | X~Δ | X | ⊚ | ⊚ | ⊚ |
| 135 | ⊚ | ⊚ | X~Δ | ⊚ | ○ |
| 136 | X~Δ | X | ⊚ | ⊚ | ⊚ |

TABLE 17

| No. | Division *1 | Base material *2 | Chromate film Forming method | Chromate film Weight (mg/m²) *3 | Organic resin *4 | Silica *5 | Chromate *6 | Resin/(silica + chromate) *7 | Silica/chromate *8 | Thickness (μm) |
|---|---|---|---|---|---|---|---|---|---|---|
| 137 | Inv. | 1 | Dried-in-place | 50 | 31 | 2 | 1 | 60/40 | 75/25 | 0.8 |
| 138 | Inv. | 1 | Dried-in-place | 50 | 31 | 3 | 1 | 60/40 | 75/25 | 0.8 |
| 139 | Inv. | 1 | Dried-in-place | 50 | 31 | 4 | 1 | 60/40 | 75/25 | 0.8 |
| 140 | Inv. | 1 | Dried-in-place | 50 | 31 | 5 | 1 | 60/40 | 75/25 | 0.8 |
| 141 | Inv. | 1 | Dried-in-place | 50 | 31 | 6 | 1 | 60/40 | 75/25 | 0.8 |
| 142 | Inv. | 1 | Dried-in-place | 50 | 31 | 7 | 1 | 60/40 | 75/25 | 0.8 |
| 143 | Inv. | 1 | Dried-in-place | 50 | 31 | 1 | 2 | 60/40 | 75/25 | 0.8 |
| 144 | Inv. | 1 | Dried-in-place | 50 | 31 | 1 | 3 | 60/40 | 75/25 | 0.8 |
| 145 | Inv. | 1 | Dried-in-place | 50 | 31 | 1 | 4 | 60/40 | 75/25 | 0.8 |
| 146 | Inv. | 1 | Dried-in-place | 50 | 31 | 1 | 5 | 60/40 | 75/25 | 0.8 |
| 147 | Inv. | 1 | Dried-in-place | 50 | 31 | 1 | 1 | 90/10 | 75/25 | 0.8 |
| 148 | Inv. | 1 | Dried-in-place | 50 | 31 | 1 | 1 | 40/60 | 75/25 | 0.8 |
| 149 | Com. | 1 | Dried-in-place | 50 | 31 | 1 | 1 | 95/5 | 75/25 | 0.8 |
| 150 | Com. | 1 | Dried-in-place | 50 | 31 | 1 | 1 | 30/70 | 75/25 | 0.8 |
| 151 | Inv. | 1 | Dried-in-place | 50 | 31 | 1 | 1 | 60/40 | 75/25 | 0.8 |

| No. | Corrosion resistance 300 cycles | Corrosion resistance 400 cycles | Image clarity | Adhesion | Weldability |
|---|---|---|---|---|---|
| 137 | ⊚ | ⊚ | ⊚ | ⊚ | ⊚ |

TABLE 17-continued

| | | | | | |
|---|---|---|---|---|---|
| 138 | ⊚ | ⊚ | △ | ⊚ | ⊚ |
| 139 | ○ | ○ | ⊚ | ⊚ | ⊚ |
| 140 | ⊚ | ⊚ | ⊚ | ⊚ | ⊚ |
| 141 | ⊚ | ⊚ | ⊚ | ⊚ | ⊚ |
| 142 | ⊚ | ⊚ | △ | ⊚ | ⊚ |
| 143 | ⊚ | ⊚ | ○~⊚ | ⊚ | ⊚ |
| 144 | ⊚ | ○ | ○ | ⊚ | ⊚ |
| 145 | ⊚ | ○ | ○ | ⊚ | ⊚ |
| 146 | ⊚ | ⊚ | ○ | ⊚ | ⊚ |
| 147 | ⊚ | ⊚ | ○ | ⊚ | ⊚ |
| 148 | ⊚ | ⊚ | ⊚ | ⊚ | ⊚ |
| 149 | △ | △~X | ⊚ | ⊚ | ⊚ |
| 150 | ⊚ | ○ | ⊚ | X | ⊚ |
| 151 | ⊚ | ⊚ | ⊚ | ⊚ | ⊚ |

TABLE 18

| No. | Division *1 | Base material *2 | Chromate film Forming method | Chromate film Weight (mg/m$^2$) *3 | Organic resin *4 | Silica *5 | Chromate *6 | Resin/ (silica + chromate) *7 | Silica/ chromate *8 | Thickness (μm) |
|---|---|---|---|---|---|---|---|---|---|---|
| 152 | Inv. | 1 | Dried-in-place | 50 | 31 | 1 | 1 | 60/40 | 10/90 | 0.8 |
| 153 | Inv. | 1 | Dried-in-place | 50 | 31 | 1 | — | 60/40 | 100/0 | 0.8 |
| 154 | Inv. | 1 | Dried-in-place | 50 | 31 | — | 1 | 60/40 | 0/100 | 0.8 |
| 155 | Inv. | 1 | Dried-in-place | 50 | 31 | 1 | 1 | 60/40 | 75/25 | 0.2 |
| 156 | Inv. | 1 | Dried-in-place | 50 | 31 | 1 | 1 | 60/40 | 75/25 | 0.3 |
| 157 | Inv. | 1 | Dried-in-place | 50 | 31 | 1 | 1 | 60/40 | 75/25 | 1.5 |
| 158 | Inv. | 1 | Dried-in-place | 50 | 31 | 1 | 1 | 60/40 | 75/25 | 2.0 |
| 159 | Com. | 1 | Dried-in-place | 50 | 31 | 1 | 1 | 60/40 | 75/25 | 0.1 |
| 160 | Com. | 1 | Dried-in-place | 50 | 31 | 1 | 1 | 60/40 | 75/25 | 2.5 |

| No. | Corrosion resistance 300 cycles | Corrosion resistance 400 cycles | Image clarity | Adhesion | Weldability |
|---|---|---|---|---|---|
| 152 | ⊚ | ⊚ | ⊚ | ⊚ | ⊚ |
| 153 | ⊚ | ⊚ | ⊚ | ⊚ | ⊚ |
| 154 | ⊚ | ⊚ | ⊚ | ⊚ | ⊚ |
| 155 | ⊚ | ○~△ | ⊚ | ⊚ | ⊚ |
| 156 | ⊚ | ⊚ | ⊚ | ⊚ | ⊚ |
| 157 | ⊚ | ⊚ | ⊚ | ⊚ | ⊚ |
| 158 | ⊚ | ⊚ | ⊚ | ⊚ | ⊚ |
| 159 | X | X | ⊚ | ⊚ | ⊚ |
| 160 | ⊚ | ⊚ | ⊚ | ⊚ | X |

INDUSTRIAL UTILITY

The coated steel sheet of this invention is useful as a material for automobiles and electric appliances for domestic use, since it has a surface which is excellent in cosmetic corrosion resistance and image clarity, as well as in paint adhesion and weldability.

We claim:

1. An organic composite coated steel sheet, and having the steel sheet a high cosmetic corrosion resistance and excellent image clarity, said coating comprising a first layer formed on the surface of a zinc or a zinc alloy plate steel sheet, and consisting of a chromate layer having a coating weight of 10 to 200 mg/m$^2$ in terms of metallic chromium, and a second layer formed on said first layer, and consisting of an organic resin film containing blocked urethane-modified epoxy resin and a rust-preventing additive in a resin/additive ratio of 90/10 to 40/60 (by weight), and having a thickness of 0.2 to 2 microns, said resin containing a modified epoxy resin (A) which comprises an epoxy resin and a polyfunctional amine, and a blocked urethane (B) which comprises a high molecular weight polyol having a molecular weight of 400 or above, a polyisocyanate and a blocking agent, in an A/B ratio of 95/5 to 50/50 (by weight).

2. An organic composite coated steel sheet, and giving the steel sheet a high cosmetic corrosion resistance and excellent image clarity, said coating comprising a first layer formed on the surface of a zinc or a zinc ally plated steel sheet, and consisting of a chromate layer having a coating weight of 10 to 200 mg/m$^2$ in terms of metallic chromium, and a second layer formed on said first layer, and consisting of an organic resin film containing a blocked urethane-modified epoxy resin and a rust-preventing additive in a resin/additive ratio of 90/10 to 40/60 (by weight), and having a thickness of 0.2 to 2 microns, said resin containing a modified epoxy resin (A) which comprises an epoxy resin, a polyfunctional amine and a monoisocyanate, and a blocked urethane (B) which comprises a high molecular weight polyol having a molecular weight of 400 or above, a polyisocyanate and a blocking agent, in an A/B ratio of 95/5 to 50/50 (by weight).

3. An organic composite coated steel sheet, and giving the steel sheet a high cosmetic corrosion resistance and excellent image clarity, said coating comprising a first layer formed on the surface of a zinc or a zinc alloy plate steel sheet, and consisting of a chromate layer having a coating weight of 10 to 200 mg/m² in terms of metallic chromium, and a second layer formed on said first layer, and consisting of an organic resin film containing a blocked urethane-modified epoxy resin and a rust-preventing additive in a resin/additive ratio of 90/10 to 40/60 (by weight), and having a thickness of 0.2 to 2 microns, said resin containing a modified epoxy resin (A) which comprises an epoxy resin, a polyfunctional amine and a phosphoric acid, and a blocked urethane (B) which comprises a high molecular weight polyol having a molecular weight of 400 or above, a polyisocyanate and a blocking agent, in an A/B ratio of 95/5 to 50/50 (by weight).

4. An organic composite coated steel sheet, and giving the steel sheet a high cosmetic corrosion resistance and excellent image clarity as set forth in any of claims 1, 2 or 3, wherein said rust-preventing additive is silica.

5. An organic composite coated steel sheet, and giving the steel sheet a high cosmetic corrosion resistance and excellent image clarity as set forth in any one of claims 1, 2 or 3, wherein said rust-preventing additive is a sparingly soluble chromate.

6. An organic composite coated steel sheet, and giving the steel sheet a high cosmetic corrosion resistance and excellent image clarity as set forth in any one of claims 1, 2 or 3, wherein said rust-preventing additive is a mixture of silica and a sparingly soluble chromate which has a silica/chromate ratio of 90/10 to 10/90 (by weight).

7. An organic composite coated steel sheet, and giving the steel sheet a high cosmetic corrosion resistance and excellent image clarity as set forth in claim 6, wherein said chromate in said organic resin film is barium chromate or strontium chromate, or a mixture thereof.

8. An organic composite coated steel sheet, and giving the steel sheet a high cosmetic corrosion resistance and excellent image clarity as set forth in claim 5, wherein said rust-preventing additive is barium chromate or strontium chromate, or a mixture thereof.

9. An organic composite coated steel sheet, and giving the steel sheet a high cosmetic corrosion resistance and excellent image clarity as set forth in any one of claims 1, 2 or 3, wherein a blocked urethane-modified epoxy resin contains a modified-epoxy resin (A) and a blocked urethane (B) in an A/B ratio of 90/10 to 60/40 (by weight).

10. An organic composite coated steel sheet, and giving the steel sheet a high cosmetic corrosion resistance and excellent image clarity as set forth in any one of claims 1, 2 or 3, wherein said polyfunctional amine is an alkanolamine.

11. An organic composite coated steel sheet, and giving the steel sheet a high cosmetic corrosion resistance and excellent image clarity as set forth in any one of claims 1, 2 or 3, wherein said epoxy resin has an epoxy equivalent of 400 or above.

12. An organic composite coated steel sheet, and giving the steel sheet a high cosmetic corrosion resistance and excellent image clarity as set forth in any one of claims 1, 2 or 3, wherein said chromate layer is one formed by coating and has a coating weight of 20 to 100 mg/m² in terms of metallic chromium.

13. An organic composite coated steel sheet, and giving the steel sheet a high cosmetic corrosion resistance and excellent image clarity as set forth in any of one claims 1, 2 or 3, wherein said epoxy resin has a epoxy equivalent of 400 or above, said polyfunctional amine is an alkanolamine, and said modified epoxy resin (A) and said blocked urethane (B) are mixed in an A/B ratio (by weight) of 90/10 to 60/40.

14. An organic composite coated steel sheet, and giving the steel sheet a high cosmetic corrosion resistance and excellent image clarity as set forth in any one of claims 1, 2 or 3, wherein said chromate layer is one formed by coating and has a coating weight of 20 to 100 mg/m² in terms of metallic chromium, said epoxy resin has an epoxy equivalent of 400 or above, said polyfunctional amine is an alkanolamine, and said modified epoxy resin (A) and said blocked urethane (B) are mixed in an A/B ratio (by weight) of 90/10 to 60/40.

15. An organic composite coated steel sheet, and giving the steel sheet a high cosmetic corrosion resistance and excellent image clarity, said coating comprising a first layer formed on the surface of a zinc or a zinc alloy plated steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/silica or chromate ration of 90/10 to 40/60 (by weight), and having a thickness of 0.3 to 1.5 microns, said resin containing a modified epoxy resin (A) which comprises an epoxy resin having an epoxy equivalent of 400 or above and an alkanolamine, and a blocked urethane (B) which comprises a high molecular weight polyol having a molecular weight of 400 or above, a polyisocyanate and a blocking agent, in an A/B ratio of 90/10 to 60/40 (by weight).

16. An organic composite coated steel sheet, and giving the steel sheet a high cosmetic corrosion resistance and excellent image clarity, said coating comprising a first layer formed on the surface of a zinc or a zinc alloy plated steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, silica and a sparingly soluble chromate selected from the group consisting of barium chromate, strontium chromate, calcium chromate, zinc chromate, potassium zinc chromate and lead chromate, and having a thickness of 0.3 to 1.5 microns, said film containing said resin in a ratio of 90/10 to 40/60 (by weight) to the total of said silica and said chromate, and said silica in a ratio of 90/10 to 10/90 (by weight) to said chromate, said resin containing a modified epoxy resin (A) which comprises an epoxy resin having an epoxy equivalent of 400 or above and an alkanolamine, and a blocked urethane (B) which comprises a high molecular weight polyol having a molecular weight of 400 or above, a polyisocyanate and a blocking agent, in an A/B ration of 90/10 to 60/40 (by weight).

17. An organic composite coated steel sheet, and giving the steel sheet a high cosmetic corrosion resistance and excellent image clarity, said coating comprising a first layer formed on the surface of a zinc or a zinc alloy plate steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/silica or chromate ratio of 90/10 to 40/60 (by weight), and having a thickness of 0.3 to 1.5 microns, said resin containing a modified epoxy resin (A) which comprises an epoxy resin having an epoxy equivalent of 400 or above, an alkanolamine and a monoisocyanate, and a blocked urethane (B) which comprise a high molecular weight polyol having a molecular weight of 400 or above, a polyisocyanate and a blocking agent, in an A/B ratio of 90/10 to 60/40 (by weight).

18. An organic composite coated steel sheet, and giving the steel sheet a high cosmetic corrosion resistance and excellent image clarity, said coating comprising a first layer formed on the surface of a zinc or a zinc alloy plated steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, silica and a sparingly soluble chromate selected from the group consisting of barium chromate, strontium chromate, calcium chromate, zinc chromate, potassium zinc chromate and lead chromate, and having a thickness of 0.3 to 1.5 microns, said film containing said resin in a ratio of 90/10 to 10/90 (by weight) to the total of said silica and said chromate, and said silica in a ratio of 90/10 to 10/90 (by weight) to said chromate, said resin containing a modified epoxy resin (A) which comprises an epoxy resin having an epoxy equivalent of 400 or above, an alkanolamine and a monoisocyanate, and a blocked urethane (B) which comprises a high molecular weight polyol having a molecular weight of 400 or above, a polyisocyanate and a blocking agent, in an A/B ratio of 90/10 to 60/40 (by weight).

19. An organic composite coated steel sheet, and giving the steel sheet a high cosmetic corrosion resistance and excellent image clarity, said coating comprising a first layer formed on the surface of a zinc or a zinc alloy plated steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/silica or chromate ratio of 90/10 to 40/60 (by weight), and having a thickness of 0.3 to 1.5 microns, said resin containing a modified epoxy resin (A) which comprises an epoxy resin having an epoxy equivalent of 400 or above, an alkanolamine and phosphoric acid, and a blocked urethane (B) which comprises a high molecular weight polyol having a molecular weight of 400 or above, a polyisocyanate and a blocking agent, in an A/B ratio of 90/10 to 60/40 (by weight).

20. An organic composite coated steel sheet, and giving the steel sheet a high cosmetic corrosion resistance and excellent image clarity, said coating comprising a first layer formed on the surface of a zinc or a zinc alloy plate steel sheet, and consisting of a chromate layer formed by coating and having a coating weight of 20 to 100 mg/m² in terms of metallic chromium, and a second layer formed on said first layer, and consisting of an organic resin film containing a blocked urethane-modified epoxy resin, silica and a sparingly soluble chromate selected from the group consisting of barium chromate, strontium chromate, calcium chromate, zinc chromate, potassium zinc chromate and lead chromate, and having a thickness of 0.3 to 1.5 microns, said film containing said resin in a ratio of 90/10 to 10/90 (by weight) to the total of said silica and said chromate, and said silica in a ratio of 90/10 to 10/90 (by weight) to said chromate, said resin containing a modified epoxy resin (A) which comprises an epoxy resin having an epoxy equivalent of 400 or above, an alkanolamine and phosphoric acid, and a blocked urethane (B) which comprises a high molecular weight polyol having a molecular weight of 400 or above, a polyisocyanate and a blocking agent, in an A/B ratio of 90/10 to 60/40 (by weight).

21. An organic composite coated steel sheet, and giving the steel sheet a high cosmetic corrosion resistance and excellent image clarity as set forth in any one of claims 1, 16, 17, 18, 19 or 20, wherein said chromate in said organic resin film is barium chromate or strontium chromate, or a mixture thereof.

22. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 10 to 200 mg/m² in terms of metallic chromium, coating said chromate surface with a paint composition, and baking said composition to form an organic resin film having a thickness of 0.2 to 2 microns on said chromate layer, said composition containing a blocked urethane-modified epoxy resin and a rust-preventing additive in a resin/additive ratio of 90/10 to 40/60 (by weight of nonvolatile matter), said resin containing a modified epoxy resin (A) which comprises an epoxy resin and a polyfunctional amine, and a blocked urethane (B) which comprises a high molecular weight polyol having a molecular weight of 400 or above, a polyisocyanate and a blocking agent, in an A/B ratio of 95/5 to 50/50 (by weight of nonvolatile matter).

23. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 10 to 200 mg/m² in terms of metallic chromium, coating said chromated surface with a paint composition, and baking said composition to form an organic resin film having a thickness of 0.2 to 2 microns on said chromate layer, said composition containing a blocked urethane-modified epoxy resin and a rust-preventing additive in a resin/additive ratio of 90/10 to 40/60 (by weight of nonvolatile matter), said resin containing a modified epoxy resin (A) which comprises an epoxy resin, a polyfunctional amine and a monoisocyanate, and a blocked urethane (B) which comprises a high molecular weight polyol having a molecular weight of 400 or above, a polyisocyanate and a blocking agent, in an A/B ration of 95/5 to 50/50 (by weight of nonvolatile matter).

24. A process for manufacturing a steel strip having an organic composite coating, and giving the strip a high cosmetic corrosion resistance and excellent image clarity which comprises chromating the surface of a zinc or a zinc ally plated steel sheet by coating it with a chromating solution, and drying it without rinsing it with water to form on said surface a chromate layer having a coating weight of 10 to 200 mg/m$^2$ in terms of metallic chromium, coating said chromated surface with a paint composition, and baking said composition to form an organic resin film having a thickness of 0.2 to 2 microns on said chromate layer, said composition containing a blocked urethane-modified epoxy resin and a rust-preventing additive in a resin/additive ratio of 90/10 to 40/60 (by weight of nonvolatile matter), said resin containing a modified epoxy resin (A) which comprises an epoxy resin, a polyfunctional amine and phosphoric acid, and a blocked urethane (B) which comprises a high molecular weight polyol having a molecular weight of 400 or above, a polyisocyanate and a blocking agent, in an A/B ratio of 95/5 to 50/50 (by weight of nonvolatile matter).

25. A process for manufacturing a steel strip having an organic composite coating, and giving the strip a high cosmetic corrosion resistance and excellent image clarity as set forth in any of claims 22, 23 or 24, wherein said rust-preventing additive in said paint composition is silica.

26. A process for manufacturing a steel strip having an organic composite coating, and giving the strip a high cosmetic corrosion resistance and excellent image clarity as set forth in any of claims 22, 23 or 24, wherein said rust-preventing additive in said paint composition is a sparingly soluble chromate.

27. A process for manufacturing a steel strip having an organic composite coating, and giving the strip a high cosmetic corrosion resistance and excellent image clarity as set forth in any of claims 22, 23 or 24, wherein said rust-preventing additive in said paint composition is a mixture of silica and a sparingly soluble chromate which has a silica-chromate ratio of 90/10 to 10/90 (by weight).

28. A process for manufacturing a steel strip having an organic composite coating, and giving the strip a high cosmetic corrosion resistance and excellent image clarity as set forth in claim 27, wherein said chromate in said paint composition is barium chromate or strontium chromate, or a mixture thereof.

29. A process for manufacturing a steel strip having an organic composite coating, and giving the strip a high cosmetic corrosion resistance and excellent clarity as set forth in claim 26, wherein said rust-preventing additive in said paint composition is barium chromate or strontium chromate, or a mixture thereof.

30. A process for manufacturing a steel strip having an organic composite coating, and giving the strip a high cosmetic corrosion resistance and excellent image clarity as set forth in any one of claims 22, 23 or 24, wherein said modified epoxy resin (A) and said blocked urethane (B) are mixed in an A/B ratio of 90/10 to 60/40 (by weight of nonvolatile matter).

31. A process for manufacturing a steel strip having an organic composite coating, and giving the strip a high cosmetic corrosion resistance and excellent image clarity as set forth in any of one claims 22, 23 or 24, wherein said polyfunctional amine in said pain composition is an alkanolamine.

32. A process for manufacturing a steel strip having an organic composite coating, and giving the strip a high cosmetic corrosion resistance and excellent image clarity as set forth in any of one claims 22, 23 or 24, wherein said epoxy resin in said pain composition has an epoxy equivalent of 400 or above.

33. A process for manufacturing a steel strip having an organic composite coating, and giving the strip a high cosmetic corrosion resistance and excellent image clarity as set forth in any one of claims 22, 23 or 24, wherein said epoxy resin has an epoxy equivalent of 400 or above, said polyfunctional amine is an alkanolamine, and said modified epoxy resin (A) and said blocked urethane (B) are mixed in an A/B ratio of 90/10 to 60/40 (by weight of nonvolatile matter).

34. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m$^2$ in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/silica or chromate ratio of 90/10 to 40/60 (by weight of nonvolatile matter), said resin containing a modified epoxy resin (A) which comprises an epoxy resin having an epoxy equivalent of 400 or above and an alkanolamine, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

35. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m$^2$ in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, silica and a sparingly soluble chromate selected from the group consisting of barium chromate, strontium chromate, calcium chromate, zinc chromate, potassium zinc chromate and lead chromate in such proportions that said resin may have a ratio of 90/10 to 40/60 (by weight of nonvolatile matter) to the total of said silica and said chromate, while said silica has a ratio of 90/10 to 10/90 (by weight of nonvolatile matter) to said chromate, said resin containing a modified epoxy resin (A) which comprises an epoxy resin having an epoxy equivalent of 400 or above and an alkanolamine, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

36. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m² in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/-silica or a chromate ratio of 90/10 to 40/60 (by weight of nonvolatile matter), said resin containing a modified epoxy resin (A) which comprises an epoxy resin having an epoxy equivalent of 400 or above, an alkanolamine and a monoisocyanate, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

37. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m² in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, silica and a sparingly soluble chromate selected from the group consisting of barium chromate, strontium chromate, calcium chromate, zinc chromate, potassium zinc chromate and lead chromate in such proportions that said resin may have a ratio of 90/10 to 40/60 (by weight of nonvolatile matter) to the total of said silica and said chromate, while said silica has a ratio of 90/10 to 10/90 (by weight of nonvolatile matter) to said chromate, said resin containing a modified epoxy resin (A) which comprises an epoxy resin having an epoxy equivalent of 400 or above, an alkanolamine and a monoisocyanate, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

38. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m² in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, and silica or a sparingly soluble chromate selected from the group consisting of barium chromate, strontium chromate, calcium chromate, zinc chromate, potassium zinc chromate and lead chromate in a resin/-silica or chromate ratio of 90/10 to 40/60 (by weight of nonvolatile matter), said resin containing a modified epoxy resin (A) which comprises an epoxy resin having an epoxy equivalent of 400 or above, an alkanolamine and phosphoric acid, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

39. A process for manufacturing a steel strip having an organic composite coating, and giving the strip a high cosmetic corrosion resistance and excellent image clarity which comprises chromating the surface of a zinc or a zinc alloy plated steel sheet by coating it with a chromating solution, and drying it without rinsing it with water to form on said surface a chromate layer having a coating weight of 20 to 100 mg/m² in terms of metallic chromium, coating said chromated surface with a paint composition, and baking said composition at a temperature of 50° C. to 300° C. (peak metal temperature) to form an organic resin film having a thickness of 0.3 to 1.5 microns on said chromate layer, said composition containing a blocked urethane-modified epoxy resin, silica and a sparingly soluble chromate selected from the group consisting of barium chromate, strontium chromate, calcium chromate, zinc chromate, potassium zinc chromate and lead chromate in such proportions that said resin may have a ratio of 90/10 to 40/60 (by weight of nonvolatile matter) to the total of said silica and said chromate, while said silica has a ratio of 90/10 to 10/90 (by weight of nonvolatile matter) to said chromate, said resin containing a modified epoxy resin (A) which comprises an epoxy resin having an epoxy equivalent of 400 or above, an alkanolamine and phosphoric acid, and a blocked urethane (B) which comprises a high molecular weight polyol having a molecular weight of 400 or above, a polyisocyanate and a blocking agent, in an A/B ratio of 90/10 to 60/40 (by weight of nonvolatile matter).

40. A process for manufacturing a steel strip having an organic composite coating, and giving the strip a high cosmetic corrosion resistance and excellent image clarity as set forth in any one of claims 34, 35, 36, 37, 38 or 39, wherein said chromate in said paint composition is barium chromate or strontium chromate, or a mixture thereof.

* * * * *